US008274233B2

(12) United States Patent
Altonen et al.

(10) Patent No.: US 8,274,233 B2
(45) Date of Patent: *Sep. 25, 2012

(54) LOAD CONTROL DEVICE HAVING A VISUAL INDICATION OF ENERGY SAVINGS AND USAGE INFORMATION

(75) Inventors: Gregory Altonen, Easton, PA (US); Elliot G. Jacoby, Glenside, PA (US); Christopher James Salvestrini, Allentown, PA (US); Jamie J. Steffie, Slatington, PA (US); Joel S. Spira, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,747

(22) Filed: Dec. 23, 2010

(65) Prior Publication Data

US 2011/0162946 A1 Jul. 7, 2011

Related U.S. Application Data

(63) Continuation-in-part of application No. 12/363,258, filed on Jan. 30, 2009, now Pat. No. 8,049,427.

(60) Provisional application No. 61/139,206, filed on Dec. 19, 2008, provisional application No. 61/117,624, filed on Nov. 25, 2008.

(51) Int. Cl.
*H05B 39/04* (2006.01)

(52) U.S. Cl. ............... 315/209 R; 315/136; 315/291; 315/131; 315/132; 315/294

(58) Field of Classification Search ............... 315/209 R, 315/209 SC, 149–158, 224, 246, 291, 294, 315/295, 307, 321, 129; 340/309, 310.14, 340/310.16, 825.22
See application file for complete search history.

(56) References Cited

U.S. PATENT DOCUMENTS

| 4,947,054 A | 8/1990 | Flowers et al. |
| 5,017,837 A | 5/1991 | Hanna et al. |
| 5,248,919 A | 9/1993 | Hanna et al. |
| 5,399,940 A | 3/1995 | Hanna et al. |

(Continued)

OTHER PUBLICATIONS

Cooper Wiring Devices, Smart Dimmer System Sell Sheet, 2005, 2 pages.

(Continued)

*Primary Examiner* — Vibol Tan
(74) *Attorney, Agent, or Firm* — Mark E. Rose; Philip N. Smith; Bridget L. McDonough

(57) ABSTRACT

A dimmer switch for controlling the amount of power delivered to and thus the intensity of a lighting load comprises a visual display operable to provide a visual indication representative of energy savings and usage information. The dimmer switch comprises an intensity adjustment actuator, such as a slider knob or a rotary knob, which may be coupled to a potentiometer for adjusting the amount of power delivered to the lighting load. The potentiometer may comprise a dual potentiometer including a resistive element and a conductive element having a cut. The visual display may comprise a single visual indicator, which may be illuminated a first color, such as green, when the intensity of the lighting load is less than or equal to the eco-level intensity, and illuminated a second different color, such as red, when the intensity of the lighting load is greater than the eco-level intensity.

21 Claims, 29 Drawing Sheets

U.S. PATENT DOCUMENTS

| | | | |
|---|---|---|---|
| 5,430,356 | A | 7/1995 | Ference et al. |
| 6,660,948 | B2 | 12/2003 | Clegg et al. |
| 6,815,625 | B1 * | 11/2004 | Leopold et al. ............... 200/296 |
| 7,012,518 | B2 * | 3/2006 | Novikov ....................... 340/538 |
| 7,071,634 | B2 | 7/2006 | Johnson et al. |
| 7,190,125 | B2 | 3/2007 | McDonough et al. |
| 7,312,695 | B2 | 12/2007 | Lehmer et al. |
| 7,361,853 | B2 | 4/2008 | Clegg et al. |
| 7,414,210 | B2 | 8/2008 | Clegg et al. |
| 7,432,460 | B2 | 10/2008 | Clegg et al. |
| 7,432,463 | B2 | 10/2008 | Clegg et al. |
| 7,511,628 | B2 | 3/2009 | Salvestrini |
| 2002/0060530 | A1 | 5/2002 | Sembhi et al. |
| 2007/0216318 | A1 | 9/2007 | Altonen et al. |
| 2007/0285027 | A1 | 12/2007 | Gehman |
| 2007/0290874 | A1 | 12/2007 | Nearhoof et al. |
| 2007/0291506 | A1 | 12/2007 | Nearhoof et al. |
| 2008/0061633 | A1 | 3/2008 | Blair et al. |
| 2008/0229226 | A1 | 9/2008 | Rowbottom et al. |
| 2008/0283621 | A1 | 11/2008 | Quirino et al. |
| 2009/0065598 | A1 | 3/2009 | Quirino et al. |
| 2010/0082228 | A1 | 4/2010 | Lee |
| 2010/0127626 | A1 | 5/2010 | Altonen et al. |

OTHER PUBLICATIONS

INNCOM, GS-700 Family Glass Series Switches Sell Sheet, Nov. 2008, 2 pages.

www.autonorth.ca, Kia's "Eco Minder" Feature, Jan. 12, 2009, 1 sheet.

European Patent Office, International Search Report and Written Opinion for International Patent Application No. PCT/US2009/065661, Feb. 10, 2010, 11 pages.

* cited by examiner

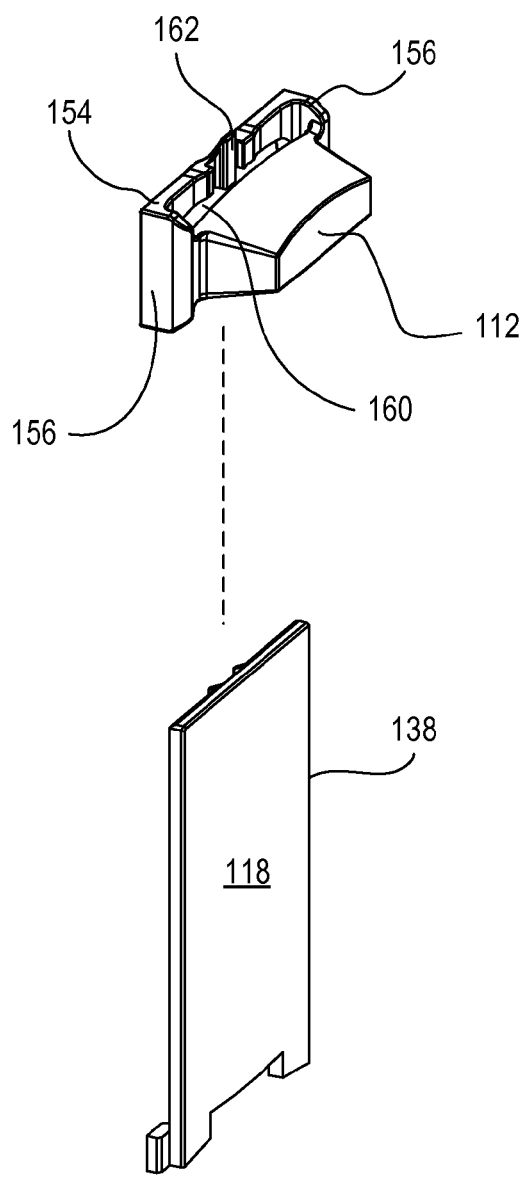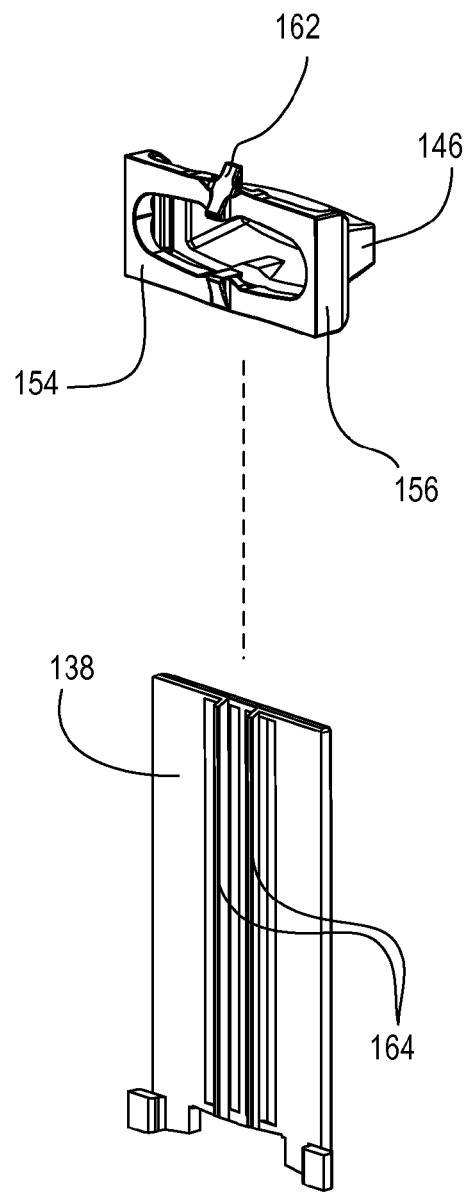
Fig. 4A
Fig. 4B

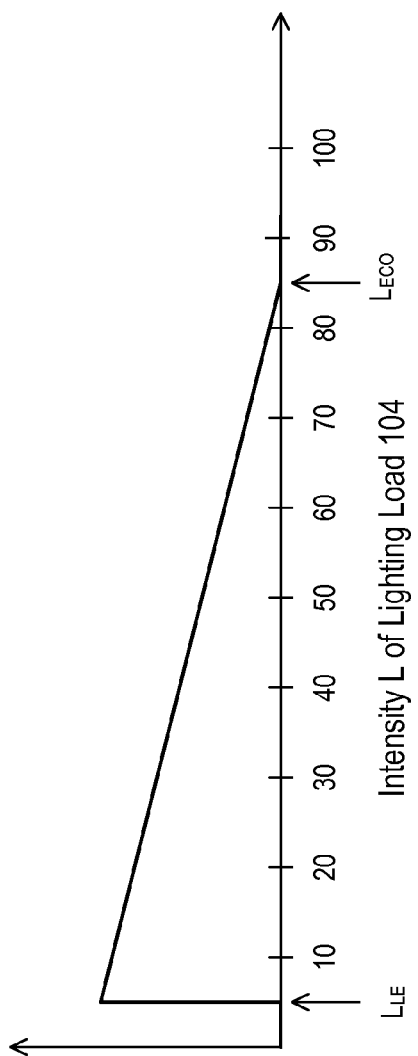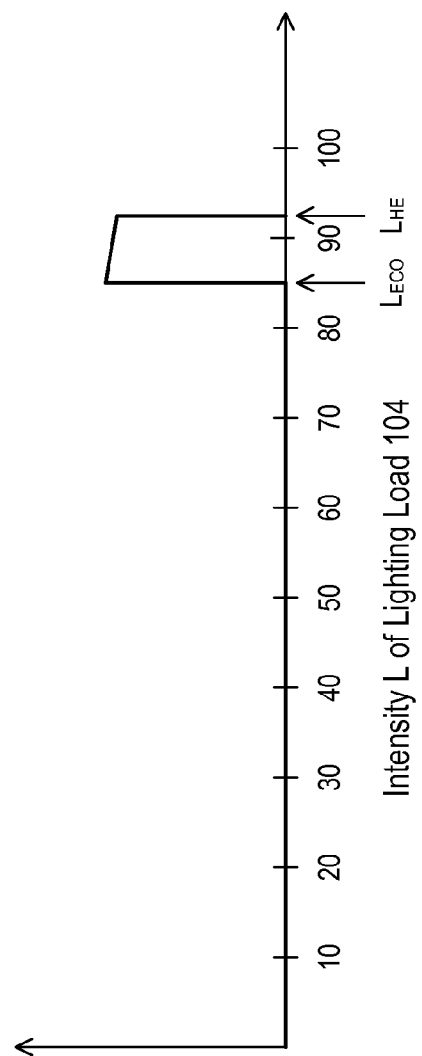

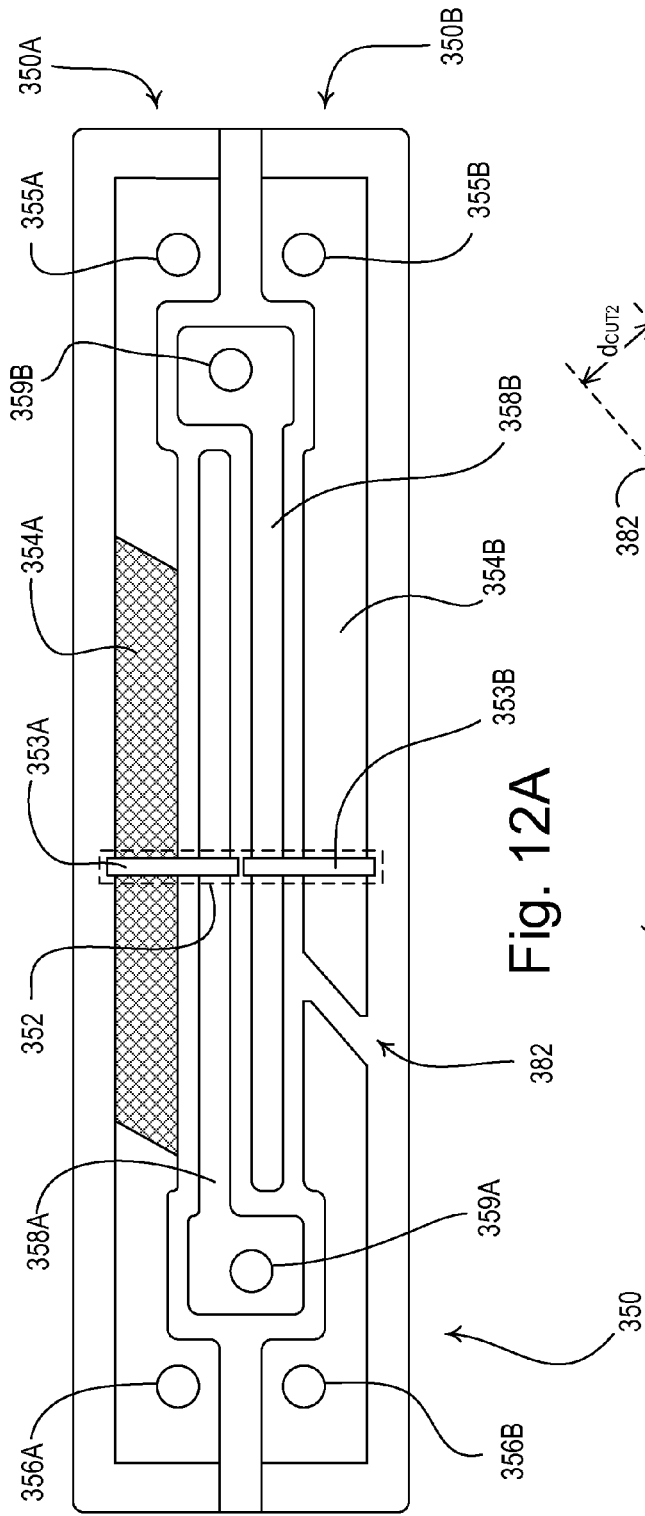
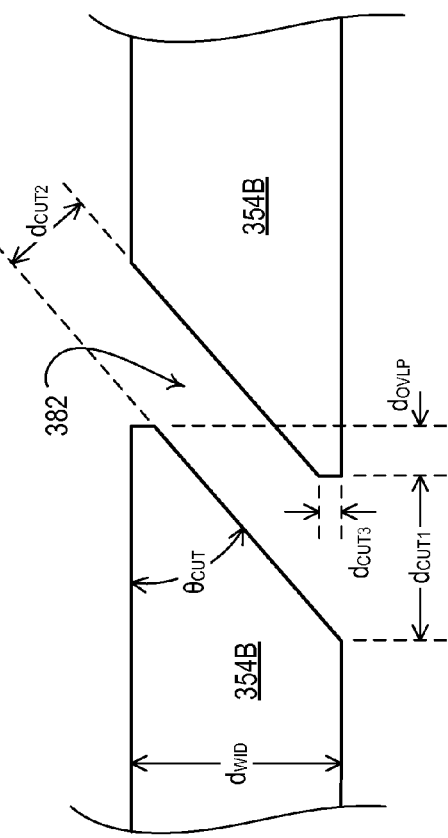
Fig. 12A
Fig. 12B

LOAD CONTROL DEVICE HAVING A VISUAL INDICATION OF ENERGY SAVINGS AND USAGE INFORMATION

RELATED APPLICATIONS

This application is a continuation-in-part application of commonly-assigned, co-pending U.S. patent application Ser. No. 12/363,258, filed Jan. 30, 2009, entitled LOAD CONTROL DEVICE HAVING A VISUAL INDICATION OF ENERGY SAVINGS AND USAGE INFORMATION, which is a non-provisional application of commonly-assigned U.S. Provisional Application Ser. No. 61/117,624, filed Nov. 25, 2008, entitled LOAD CONTROL DEVICE THAT PROVIDES A VISUAL INDICATION OF ENERGY SAVING INFORMATION, and U.S. Provisional Application Ser. No. 61/139,206, filed Dec. 19, 2008, entitled LOAD CONTROL DEVICE PROVIDING A VISUAL INDICATION OF ENERGY USAGE INFORMATION, the entire disclosures of which are hereby incorporated by reference.

BACKGROUND OF THE INVENTION

1. Field of the Invention

The present invention relates to a load control device for controlling the amount of power delivered to an electrical load, and more particularly, to a dimmer switch having a visual display, such as a single visual indicator or a linear array of visual indicators, for providing a visual indication of energy savings or usage information.

2. Description of the Related Art

A conventional wall-mounted load control device is mounted to a standard electrical wall box and is coupled between a source of alternating-current (AC) power (typically 50 or 60 Hz line voltage AC mains) and an electrical load, such as, a lighting load. Standard load control devices (such as dimmer switches) use one or more semiconductor switches, typically bidirectional semiconductor switches, such as triacs or field effect transistors (FETs), to control the current (and ultimately the power) delivered to the load, and thus, the intensity of the light provided by the lighting load between a maximum intensity and a minimum intensity. The semiconductor switch is typically coupled in series between the source and the lighting load. Using a phase-control dimming technique, the dimmer switch renders the semiconductor switch conductive for a portion of each line half-cycle to provide power to the lighting load, and renders the semiconductor switch non-conductive for the other portion of the line half-cycle to prevent current from flowing to the load. The ratio of the on-time, during which the semiconductor switch is conductive, to the off-time, during which the semiconductor switch is non-conductive, determines the intensity of the light produced by the lighting load.

Wall-mounted dimmer switches typically include a user interface having a means for adjusting the lighting intensity of the load, such as a linear slider, a rotary knob, or a rocker switch. Dimmer switches also typically include a button or switch that allows for toggling of the load from off (i.e., no power is conducted to the load) to on (i.e., power is conducted to the load), and vice versa.

When controlled to an intensity below the maximum intensity, the dimmer switch is operable to save energy since less power is being delivered to the lighting load. In fact, if a connected lighting load is controlled to approximately 85% of the maximum possible intensity of the lighting load, the dimmer switch provides an energy savings of approximately 15% of the maximum possible power consumption of the lighting load. In addition, the difference between the maximum possible intensity and 85% of the maximum possible intensity is barely perceptible to the human eye. However, many users of dimmer switches unintentionally control the intensity of the lighting load to a level that is higher than actually needed, i.e., to a level that provides more light than is needed, thus, wasting energy. Therefore, there is a need for a dimmer switch that provides a visual indication of energy savings or usage information, such that the user is able to make a knowledgeable, intentional decision of the desired lighting intensity to energy.

SUMMARY OF THE INVENTION

According to an embodiment of the present invention, a dimmer switch for controlling the amount of power delivered from a power source to a lighting load comprises a controllably conductive device, an intensity adjustment actuator, and a visual indicator operable to be illuminated a first color when the intensity of the lighting load is less than or equal to a predetermined eco-level intensity, and a second color different than the first color when the intensity of the lighting load is greater than the predetermined eco-level intensity. The controllably conductive device is adapted to be coupled in series electrical connection between the source and the lighting load for controlling the intensity of the lighting load. The intensity adjustment actuator is operatively coupled to the controllably conductive device, such that the controllably conductive device can adjust the intensity of the lighting load between a low-end (or minimum) intensity and a high-end (or maximum) intensity in response to actuations of the intensity adjustment actuator. The predetermined eco-level intensity is greater than approximately 75% of a maximum possible intensity of the lighting load. The intensity adjustment actuator may comprise a slider knob adapted to move linearly along the length of a slider opening or a rotary knob adapted to be rotated.

According to another embodiment of the present invention, the visual indicator is operable to be illuminated a first color when the intensity of the lighting load is less than or equal to a predetermined lower eco-level intensity, and a second color different than the first color when the intensity of the lighting load is greater than a predetermined upper eco-level intensity, where the lower and upper eco-level intensities are greater than approximately 75% of a maximum possible intensity of the lighting load. The visual indicator may be illuminated a third color when the intensity of the lighting load is between the upper and lower eco-level intensities.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form, which is presently preferred, it being understood, however, that the invention is not limited to the precise arrangements and instrumentalities shown. The features and advantages of the present invention will become apparent from the following description of the invention that refers to the accompanying drawings, in which:

FIG. 4A is a front exploded perspective view of a slider knob and a rear slider surface of the dimmer switch of FIG. 1;

FIG. 4B is a rear perspective view of the slider knob and the rear slider surface of FIG. 4B;

FIGS. 6A and 6B show example plots of intensities of a green light-emitting diode and a red light-emitting diode, respectively, with respect to the intensity of the lighting load of FIG. 1;

FIG. 12A is an example electrical layout of a dual linear potentiometer of the tabletop dimmer switch of FIG. 10;

FIG. 12B is an enlarged view of a portion of the electrical layout of the potentiometer of FIG. 12A;

DETAILED DESCRIPTION OF EMBODIMENTS OF THE INVENTION

Figure 1:
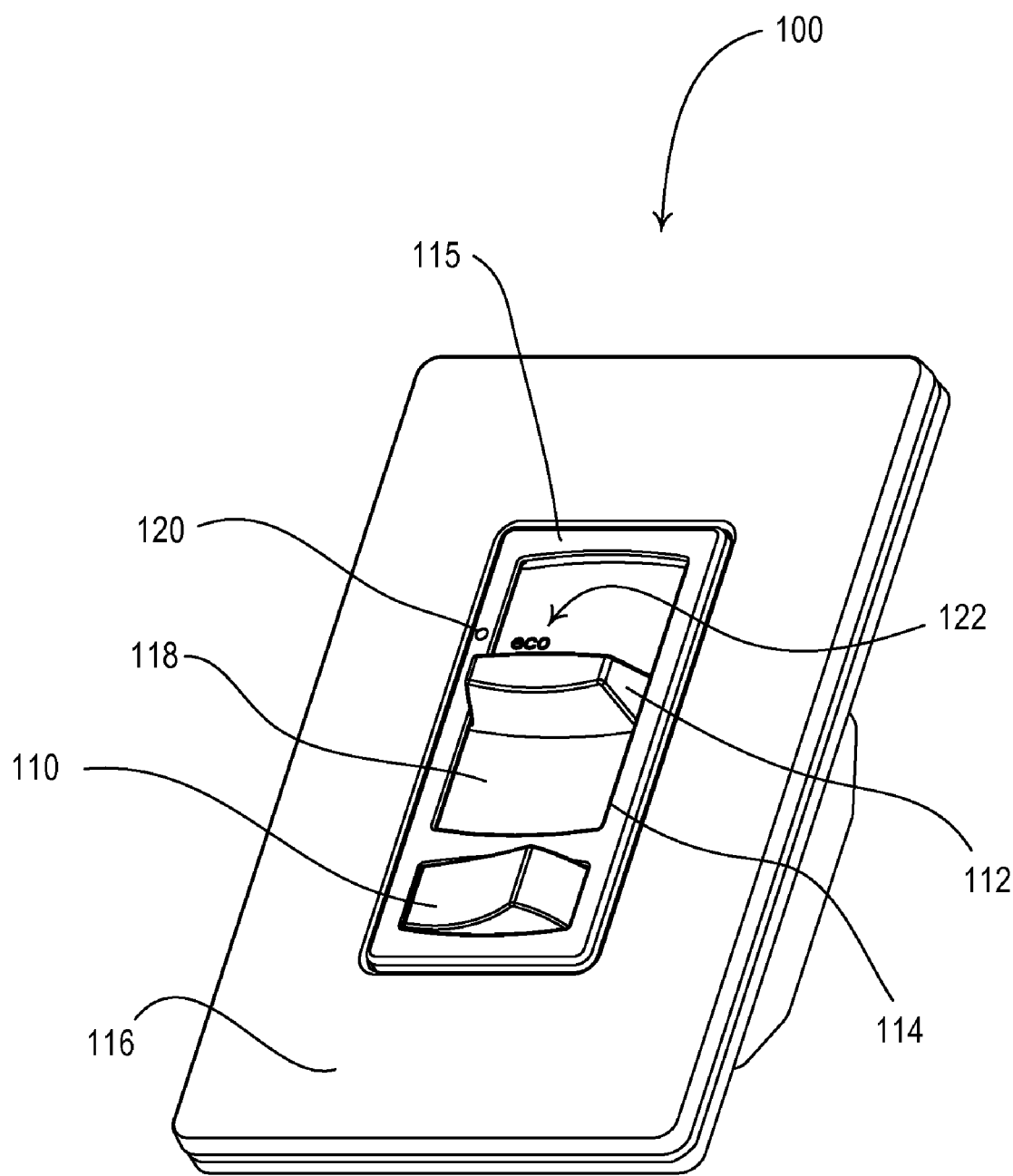
FIG. 1 is a perspective view of a dimmer switch that provides a visual indication of energy savings and usage information of the dimmer switch and a connected lighting load according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
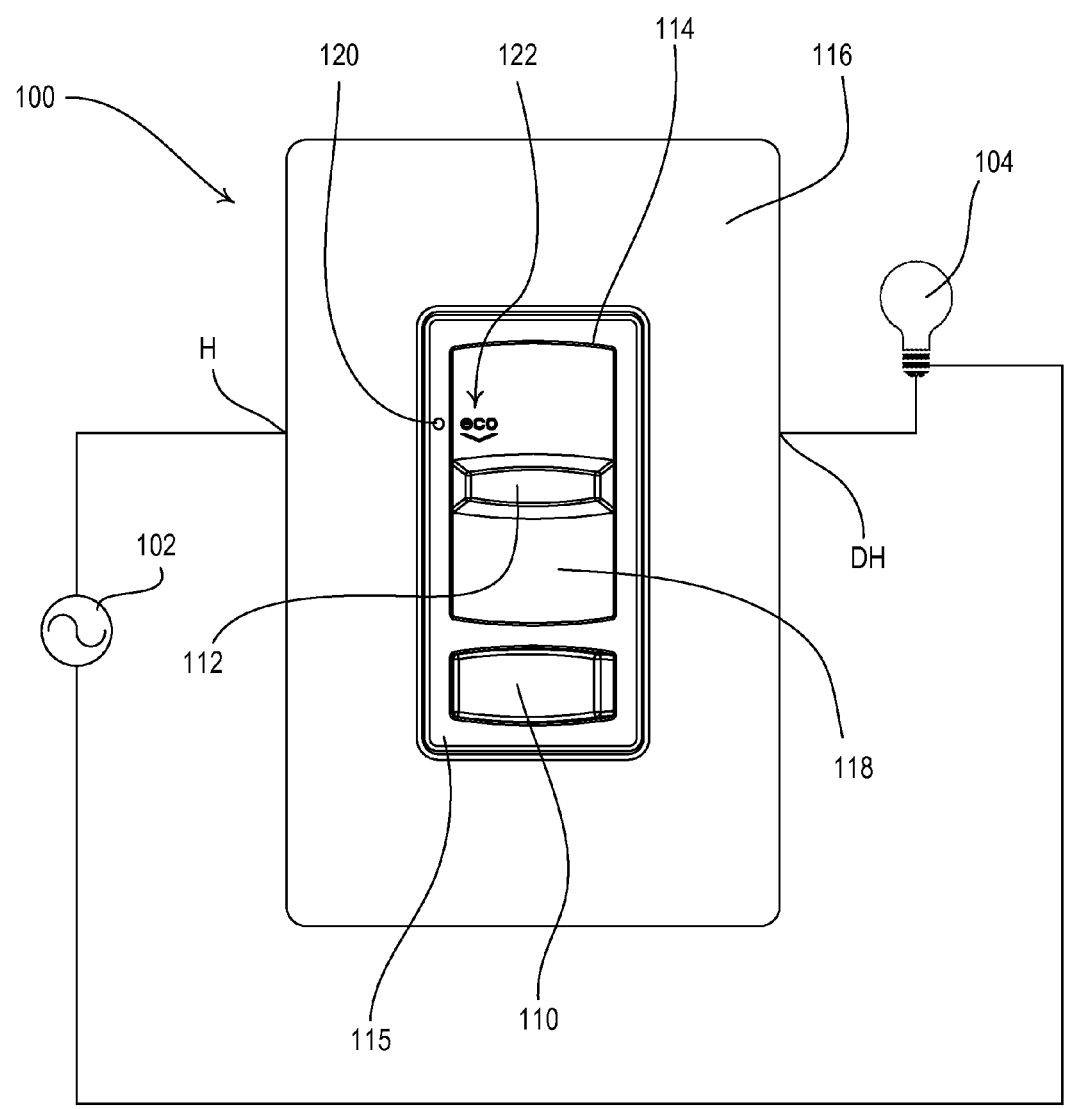
FIG. 2 shows a front view of the dimmer switch of FIG. 1.

FIG. 1 is a perspective view of a dimmer switch 100 that provides a visual indication of energy savings and usage information according to a first embodiment of the present invention. FIG. 2 shows a front view of the dimmer switch 100, which is coupled in series electrical connection between an alternating-current (AC) power source 102 and a lighting load 104 for control of the amount of power delivered to the lighting load. The dimmer switch 100 is coupled to the power source 102 via a hot terminal H and to the lighting load 104 via a dimmed hot terminal DH. Accordingly, the dimmer switch 100 is operable to turn the lighting load 104 on and off and to control a present lighting intensity L (i.e., a perceived lighting intensity) of the lighting load across a dimming range between a low-end lighting intensity $L_{LE}$ (e.g., approximately 5% of a maximum possible intensity $L_{MAX}$) and a high-end lighting intensity $L_{HE}$ (e.g., approximately 92% of the maximum possible intensity $L_{MAX}$). The maximum possible intensity $L_{MAX}$ is the intensity of the lighting load 104 if the lighting load is coupled directly to the power source 102 or if the lighting load is controlled by a standard switch. Due to the internal circuitry, the dimmer switch 100 is not able to control the lighting intensity L of the lighting load 104 above the high-end lighting intensity $L_{HE}$ or below the low-end lighting intensity $L_{LE}$. However, the dimmer switch 100 can turn the lighting load off (i.e., control the lighting intensity L to approximately 0%).

The dimmer switch 100 comprises a user interface having a rocker switch 110 and a slider knob 112 (i.e., an intensity adjustment actuator). The rocker switch 110 allows for turning on and off the connected lighting load 104. The slider knob 112 allows for adjustment of the lighting intensity L of the lighting load 104 from the low-end lighting intensity $L_{LE}$ to the high-end lighting intensity $L_{HE}$. The slider knob 112 is operable to move linearly in a vertical direction along the length of a slider opening 114 of a bezel 115, which is received in an opening of a faceplate 116. A rear slider surface 118 can be seen through the slider opening 114 and is fixed in relation to the bezel 115. The slider knob 112 translates across the rear slider surface 118 and is attached to the internal circuitry of the dimmer switch 100 around the edges of the rear slide surface as will be described in greater detail below with reference to FIGS. 3, 4A, and 4B. Alternatively, the dimmer switch 100 may comprise a "slide-to-off" dimmer, i.e., the dimmer switch may not include the rocker switch 110 and may only include the slider actuator 112.

The dimmer switch 100 also includes a visual display comprising a single visual indicator 120, which is illuminated to provide the visual indication of energy savings and usage information of the dimmer switch. Specifically, the dimmer switch 100 illuminates the visual indicator 120 in a first manner when the position of the slider knob 112 is adjusted such that the amount of power being delivered to the lighting load 104 is less than or equal to a predetermined eco-level power threshold $TH_{ECO}$, which corresponds to an eco-level lighting intensity $L_{ECO}$. The dimmer switch 100 illuminates the visual indicator 120 in a second manner when the position of the slider knob 112 is adjusted such that the amount of power being delivered to the lighting load 104 is greater than the predetermined power threshold $TH_{ECO}$. For example, the dimmer switch 100 may illuminate the visual indicator 120 a first color (e.g., green) when the amount of power being delivered to the lighting load 104 is less than or equal to the predetermined power threshold $TH_{ECO}$, and may illuminate the visual indicator a second color (e.g., red) when the amount of power being delivered to the lighting load 104 is greater than the predetermined power threshold $TH_{ECO}$. Accordingly, by illuminating the visual indicator 120 red, the dimmer switch 100 provides a warning that the dimmer switch and the lighting load 104 are consuming more power than may be necessary. Alternatively, the dimmer switch 100 may illuminate the visual indicator 120 a different color (i.e., blue, orange, or yellow) when the amount of power being delivered to the lighting load 104 is greater than the predetermined power threshold $TH_{ECO}$.

The present lighting intensity L (i.e., the perceived lighting intensity) of the lighting load 104 is dependent upon the amount of power being delivered to the lighting load 104. Thus, the dimmer switch 100 is operable to save energy by dimming the lighting load 104. For example, the dimmer switch 100 is operable to control the amount of power consumed by the lighting load 104 to be less than a maximum possible amount of power $P_{MAX}$ that can be delivered by the power source 102 to the lighting load 104 by controlling the intensity of the lighting load as shown in the following table.

TABLE 1

| Power consumption at lighting intensity of lighting load | |
|---|---|
| Present lighting intensity L of the lighting load 104 (as a percentage of the maximum lighting intensity $L_{MAX}$) | Power consumed by the lighting load 104 (as a percentage of the maximum possible amount of power $P_{MAX}$) |
| 90% | 90% |
| 85% | 85% |
| 80% | 82% |
| 75% | 80% |
| 70% | 76% |
| 65% | 72% |
| 60% | 68% |
| 55% | 64% |
| 50% | 60% |

The perceived lighting intensity is equal to approximately the square-root of a measured lighting intensity (i.e., in lumens). This relationship is commonly known as "square-law dimming".

Therefore, the predetermined power threshold $TH_{ECO}$ of the dimmer switch 100 may comprise an appropriate amount of power that causes the lighting load 104 to save energy (as compared to the maximum possible amount of power $P_{MAX}$ that can be delivered by the power source 102 to the lighting load 104), while still providing an appropriate amount of illumination to perform normal tasks in the space illuminated by the lighting load. For example, the predetermined power threshold $TH_{ECO}$ may be approximately 80% of the maximum possible amount of power $P_{MAX}$ or greater, such that the eco-level lighting intensity $L_{ECO}$ is greater than approximately 75% of the maximum lighting intensity $L_{MAX}$ of the lighting load 104. Particularly, the predetermined power threshold $TH_{ECO}$ may be chosen such that the difference in the illumination provided by the lighting load 104 at the eco-level lighting intensity $L_{ECO}$ and at the high-end lighting intensity $L_{HE}$ is imperceptible to most users. This may be achieved when the predetermined power threshold $TH_{ECO}$ is approximately 85% and the eco-level lighting intensity $L_{ECO}$ is approximately 85%.

The visual indicator 120 may be located at a position along the length of the slider opening 114 that is representative of the value of the eco-level lighting intensity $L_{ECO}$. For example, as shown in FIG. 2, the visual indicator 120 may be located adjacent to the position at which the slider knob 112 is located when the lighting intensity L of the lighting load 104 is approximately 85% of the maximum lighting intensity $L_{MAX}$. In other words, the slider knob 112 is adjacent the visual indicator 120 when the visual indicator changes colors. In addition, an icon 122 (such as the text "eco") may be provided on the rear slider surface 118 adjacent to the visual indicator 120 as shown in FIG. 2. Further, the intensity of the visual indicator 120 may be controlled, such that the intensity of the visual indicator increases as the amount of power being delivered to the lighting load 104 decreases. Accordingly, as the lighting load 104 is dimmed, the increase in the intensity of the visual indicator 120 is representative of the increase in the amount of power that is being saved. When the lighting load 104 is off, the dimmer switch 100 illuminates the visual indicator 120 dimly to provide a nightlight feature.

In addition, the dimmer switch 100 may comprise tactile feedback through the slider knob 112 to indicate when the intensity of the lighting load is at the eco-level lighting intensity $L_{ECO}$. For example, the dimmer switch 100 may comprise a detent along the length of the slider opening 114, such that the slider knob 112 is temporarily held in place adjacent to the visual indicator 120, but can be moved from the location of the detent by additional force applied to the slider knob.

Figure 3:
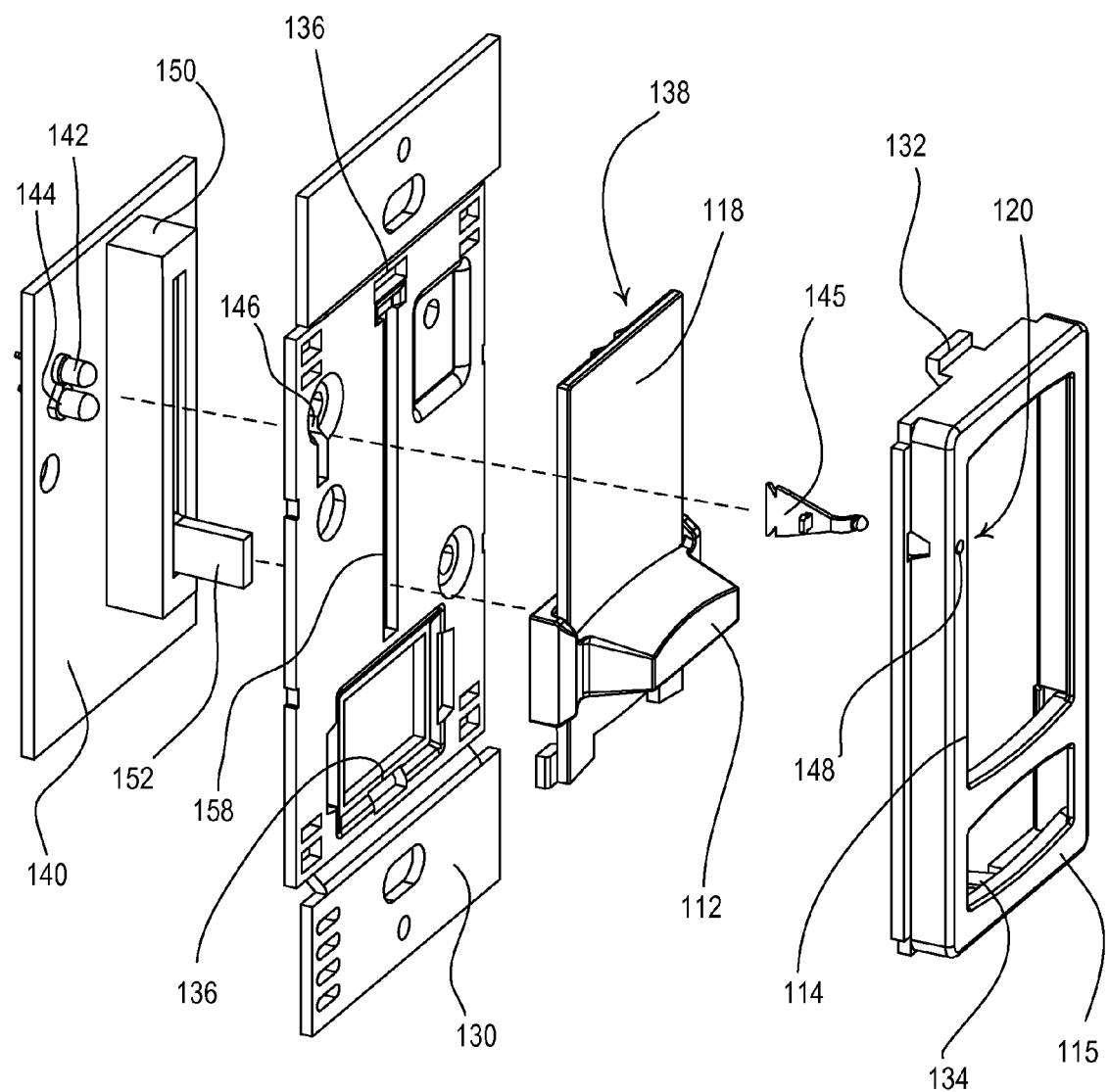
FIG. 3 is an exploded perspective view of the dimmer switch of FIG. 1.
Figure 5:
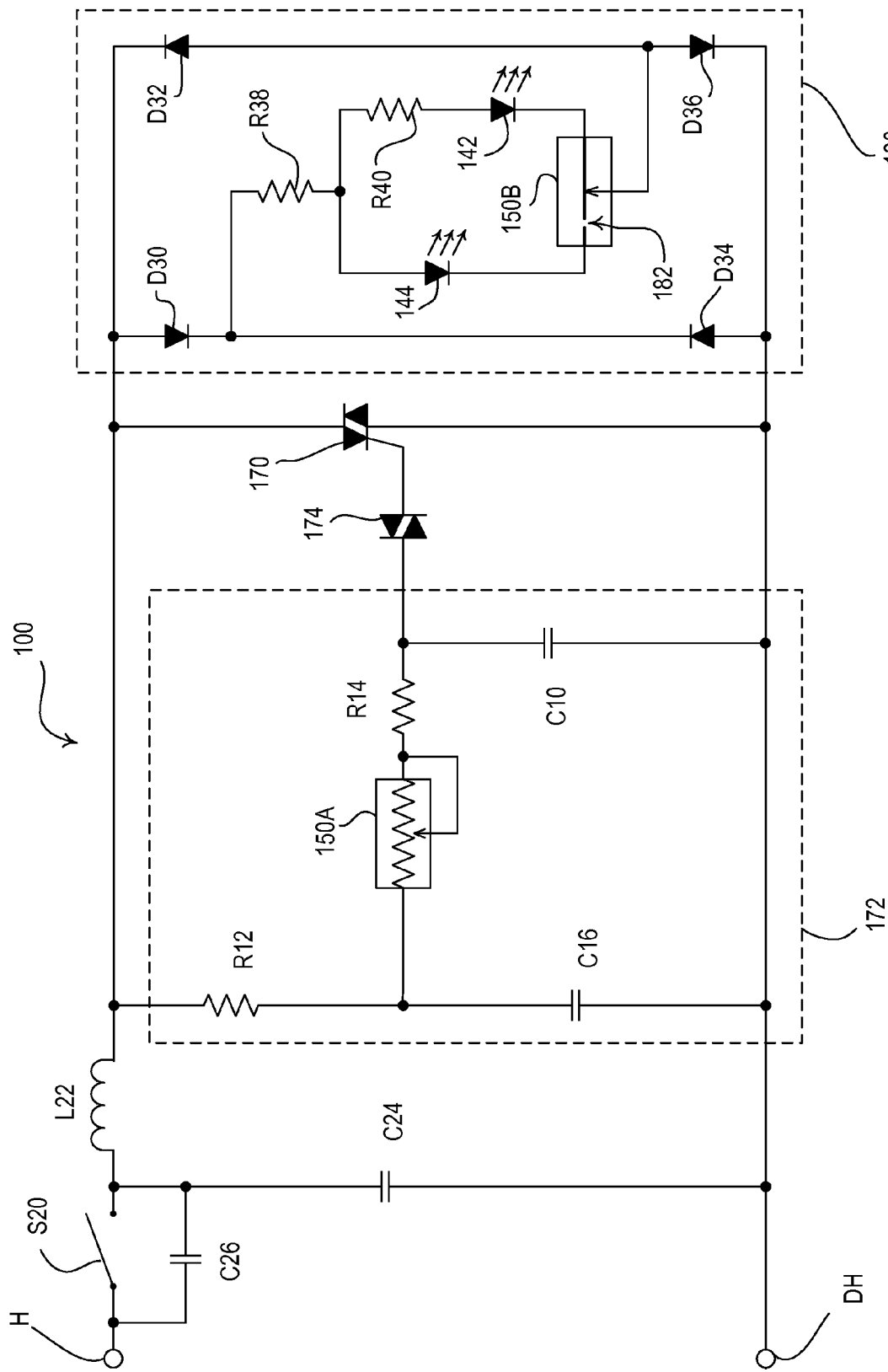
FIG. 5 is a simplified schematic diagram of the dimmer switch of FIG. 1.

FIG. 3 is an exploded perspective view of the dimmer switch 100. The dimmer switch 100 comprises a mounting yoke 130, which allows the dimmer switch to be mounted to a standard electrical wallbox. A tab 132 and a snap 134 of the bezel 115 are received in attachment openings 136 of the yoke 130 to allow the bezel to be connected to the yoke. The circuitry of the dimmer switch 100, which will be described in greater detail with reference to FIG. 5, is mounted to a printed circuit board (PCB) 140. Specifically, a green light-emitting diode (LED) 142 and a red light-emitting diode 144 are mounted on the PCB 140 and operate to illuminate the visual indicator 120 on the bezel 115. A light pipe 145 extends through a light pipe slot 146 in the yoke 130 and a light pipe opening 148 in the bezel 115, such that illumination from the LEDs 142, 144 may be conducted to the visual indicator 120.

FIG. 4A is a front exploded perspective view and FIG. 4B is a rear perspective view of the slider knob 112 and a rear slider structure 138 on which the rear slider surface 118 is provided. The slider knob 112 is mechanically coupled to a shaft 152 of a potentiometer 150, which is mounted to the PCB 140 to provide for adjustment of the amount of power being delivered to the lighting load 104. The slider knob 112 is connected to a coupling member 154 via walls 156. The shaft 152 of the potentiometer 152 extends through a shaft opening 158 of the yoke 130 and is connected to the coupling member 154. As shown in FIGS. 4A and 4B, the slider knob 112, the walls 156, and the coupling member 154 form a single piece and define a slider knob opening 160. The rear slider structure 138 is received through the slider knob opening 160, such that the slider knob 112 is able to slide across the rear slider surface 118. The rear slider structure 138 is attached to the rear of the bezel 115 and the slider knob 112 is captured within the slider opening 114. A slider tab 162 of the coupling member 154 is received by guide rails 164 of the rear slider structure 138 to provide for the correct horizontal alignment of the slider knob 112 as the knob moves across the length of the slider opening 114.

FIG. 5 is a simplified schematic diagram of the dimmer switch 100. The dimmer switch 100 comprises a triac 170, which is coupled in series between the hot terminal H and the dimmed hot terminal DH for control of the amount of power delivered to the lighting load 104. The triac 170 may alternatively be replaced by any suitable bidirectional switch, such as, for example, a field-effect transistor (FET) or an insulated gate bipolar junction transistor (IGBT) in a rectifier bridge, two FETs in anti-series connection, two IGBTs in anti-series connection, or a pair of silicon-controlled rectifiers. A timing circuit 172 is also coupled in series between the hot terminal H and the dimmed hot terminal DH and operates to generate a firing voltage at an output across a capacitor C10 (e.g., having a capacitance of approximately 0.1 µF). The timing circuit 172 also comprises two resistors R12, R14 (e.g., having resistances of approximately 5.6 kΩ and 10 kΩ, respectively) and a capacitor C16 (e.g., having a capacitance of approximately 0.1 µF). The series combination of the resistor R12 and the capacitor C16 is coupled in series between the hot terminal H and the dimmed hot terminal DH.

A diac 174 is coupled in series between the output of the timing circuit 172 and a control input (i.e., a gate) of the triac 170 and is characterized by a break-over voltage of, for example, approximately 32 V. The diac 174 is operable to conduct current through the control input of the triac 170 to render the triac conductive in response to the magnitude of the firing voltage (i.e., when the magnitude of the firing voltage exceeds approximately the break-over voltage of the diac). The dimmer switch 100 also comprises a visual indicator circuit 180, which includes the LEDs 142, 144 and will be described in greater detail below.

The potentiometer 150 comprises a dual linear potentiometer, which has, for example, two internal linear potentiometer portions 150A, 150B. The potentiometer portions 150A, 150B have respective wipers, which move together in response to movements of the single shaft 152 of the potentiometer 150. The first potentiometer portion 150A is part of the timing circuit 172 and has a resistive element that extends between two main terminals of the first potentiometer portion and has, for example, a resistance of approximately 300Ω. The wiper of the first potentiometer portion 150A is electrically coupled to the second main terminal, such that the resistance between the first main terminal and the wiper is variable in response to the position of the shaft 152. The firing capacitor C10 is operable to charge through the first potentiometer portion 150A and the two resistors R12, R14. Accordingly, the rate at which the capacitor C10 charges, and thus, the time at which the triac 170 is rendered conductive each half-cycle, is dependent upon the position of the shaft 152 of the potentiometer 150 and the resistance between the first main terminal and the wiper of the first potentiometer portion 150A.

A mechanical switch S20 is coupled in series between the hot terminal H and the junction of the triac 170 and the timing circuit 172. The switch S20 is the electrical representation of the rocker switch 110 of the dimmer switch 100. When the switch S20 is closed, the timing circuit 172 operates to fire the triac 170 each half-cycle, such that the lighting load 104 is illuminated. When the switch S20 is open, the lighting load 104 is off. The dimmer switch 100 also comprises an input noise/EMI filter circuit comprising an inductor L22 (e.g., having an inductance of approximately 10 µH) and a capacitor C24 (e.g., having a capacitance of approximately 0.1 µF).

The visual indicator circuit 180 comprises a full-wave rectifier bridge including diodes D30, D32, D34, D36. The rectifier bridge has AC terminals coupled in parallel electrical connection with the triac 170 and DC terminals for providing a rectified direct-current (DC) voltage. A resistor R28 is coupled in series between the DC terminals of the rectifier bridge and has, for example, a resistance of approximately 56 kΩ. A resistor R40 is coupled in series with the green LED 142 and has, for example, a resistance of approximately 100 kΩ. The red LED 144 is coupled in parallel electrical connection with the series combination of the resistor R40 and the green LED 142.

The second potentiometer portion 150B is part of the visual indicator circuit 180 and has a first main terminal coupled to the green LED 142 and a second main terminal coupled to the red LED 144. The wiper of the second potentiometer portion 150B is coupled in series with the DC terminals of the rectifier bridge. The second potentiometer portion 150B has a conductive element, which extends between the two main terminals and has a cut 182 (i.e., a break) near the second main terminal. When the wiper is close to the first main terminal (i.e., to the right of the cut 182 as shown in FIG. 5), only the green LED 142 is coupled in series between the DC terminals of the rectifier bridge and is illuminated. When the wiper is close to the second main terminal (i.e., to the left of the cut 182 as shown in FIG. 5), only the red LED 144 is coupled in series between the DC terminals of the rectifier bridge and is illuminated. The cut 182 is positioned along the length of the conductive element of the second potentiometer portion 150B, such that the green LED 142 is illuminated when the present intensity L of the lighting load 104 is less than or equal to the eco-level lighting intensity $L_{ECO}$ (i.e., 85%) and the red LED 144 is illuminated when the present intensity L of the lighting load 104 is greater than the eco-level lighting intensity $L_{ECO}$.

Since the visual indicator circuit 180 is coupled in parallel with the triac 170, the intensity of the green LED 142 is dependent upon the conduction time of the triac each half-cycle and thus the amount of power presently being delivered to the lighting load 104. The instantaneous voltage across the visual indicator circuit 180 is equal to approximately zero volts when the triac 170 is conductive. Thus, the average voltage across the visual indicator circuit 180 decreases as the conduction time of the triac 170 increases. Accordingly, the intensity of the green LED 142 is inversely proportional to the intensity of the lighting load 104, such that the intensity of the green LED 142 is representative of the amount of power that is being saved (i.e., becomes brighter as more power is being saved). A capacitor C30 (e.g., having a capacitance of 0.01 µF) is coupled across the switch S20, such that the green LED 142 or the red LED 144 (depending upon the position of the potentiometer 150) is operable to conduct a small amount off current to be dimly illuminated to provide the nightlight feature when the switch S20 is open and the lighting load 104 is off.

FIGS. 6A and 6B show example plots of the perceived intensities of the green LED 142 and the red LED 144, respectively, with respect to the present lighting intensity L of the lighting load 104. Both the green LED 142 and the red LED 144 are off when the switch S20 is open and the lighting load 104 is off. At the low-end lighting intensity $L_{LE}$ of the lighting load 104 (i.e., approximately 5%), the intensity of the green LED 142 is illuminated at a maximum intensity, while the red LED 144 is not illuminated. As the intensity L of the lighting load 104 increases, the intensity of the green LED 142 decreases to approximately 0% at the eco-level threshold intensity $L_{ECO}$ (i.e., approximately 85%). For simplicity, the intensity of the green LED 142 is shown in FIG. 6A as decreasing linearly as the lighting intensity L of the lighting load 104 increases. However, the intensity of the green LED 142 may actually decrease in a non-linear fashion with respect to the lighting intensity L of the lighting load 104. When the present intensity L of the lighting load 104 is greater than the eco-level threshold intensity $L_{ECO}$, the red LED 144 is turned on, while the green LED 146 is turned off. Since the visual indicator circuit 180 is coupled in parallel with the triac 170, the intensity of the red LED 144 decreases slightly as the present intensity L of the lighting load 104 is increased from the eco-level threshold intensity $L_{ECO}$ to the high-end lighting intensity $L_{HE}$. However, this change in the intensity of the red LED 144 is typically imperceptible to the human eye.

Alternatively, the first main terminal of the second potentiometer portion 150B could be electrically coupled directly to the wiper, so that the green LED 142 is always coupled in series between with DC terminals of the rectifier bridge and the red LED 144 is switched in and out of the visual indicator circuit 180 in response to the position of the second potentiometer portion. This allows for a more seamless transition when the visual indicator 120 changes from green to red (and vice versa), and avoids a potential dead point at which both of the LEDs are not illuminated due to the cut 182 in the conductive element of the second potentiometer portion 150B. When the present intensity L of the lighting load 104 is less than or equal to the eco-level lighting intensity $L_{ECO}$, only the green LED 142 is illuminated. However, when the present intensity L of the lighting load 104 is greater than the eco-level lighting intensity $L_{ECO}$, both the green LED 142 and the red LED 144 are illuminated at the same time. Since the voltage drop produced across the red LED 144 is also produced across the series combination of the resistor R40 and the green LED 142, the green LED 142 is illuminated to such a low level that the red LED 144 overpowers the green LED 142 and the visual indicator 120 is only illuminated red. Therefore, as the present intensity L of the lighting load 104 is increased from below to above the eco-level lighting intensity $L_{ECO}$, the green LED 142 is illuminated up to the point at which the red LED 144 is switched on and overpowers the green LED.

Figures 7A, 7B:
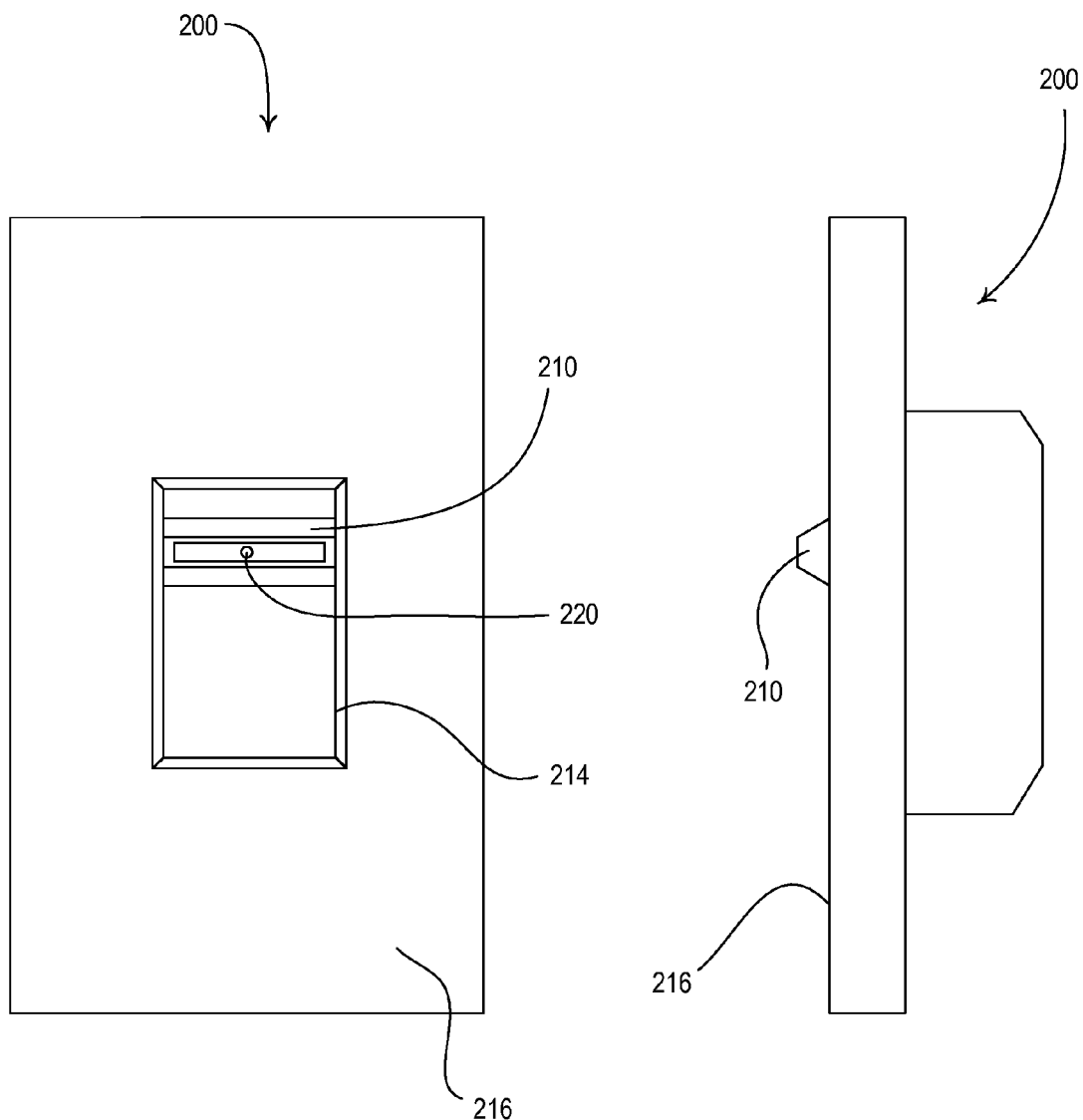
FIG. 7A is a front view of a "slide-to-off" dimmer switch for providing a visual indication representative of energy savings and usage information according to a second embodiment of the present invention.
FIG. 7B is a right-side view of the slide-to-off dimmer switch of FIG. 7A.

FIG. 7A is a front view and FIG. 7B is a right-side view of a slide-to-off dimmer switch 200 for providing a visual indication representative of energy savings and usage information according to a second embodiment of the present invention. The dimmer switch 200 comprises a slider knob 210 adapted to slide along the length of an opening 214 of a faceplate 216. Adjustment of the slider knob 210 causes the dimmer switch 200 to adjust the amount of power delivered to the connected lighting load 104 and thus the intensity of the lighting load. When the slider knob 210 is adjusted to the lowermost position, the slider knob is operable to actuate the mechanical switch S20 to open the mechanical switch S20, such that the dimmer switch 200 turns off the connected lighting load 104. Alternatively, the dimmer switch 200 could comprise a toggle actuator (not shown) that is positioned in the middle of the slider knob 210 and is coupled to the mechanical switch S20 for turning the lighting load 104 on and off, as described in greater detail in commonly-assigned U.S. Pat. No. 4,947,054, issued Aug. 7, 1990, entitled SLIDING DIMMER SWITCH, the entire disclosure of which is hereby incorporated by reference.

The dimmer switch 200 further comprises a single visual indicator 220 on the slider knob 210, such that the visual indicator moves as the position of the slider knob is adjusted. The visual indicator 220 is illuminated to provide the visual indication of energy savings and usage information of the dimmer switch 200. Specifically, the dimmer switch 200 illuminates the visual indicator 220 the first color (i.e., green) when the intensity of the connected lighting load 104 is less than or equal to the eco-level lighting intensity $L_{ECO}$, and illuminates the visual indicator 220 the second color (i.e., red) when the intensity of the connected lighting load is greater than the eco-level lighting intensity $L_{ECO}$. The assembly of the dimmer switch 200 to allow for illumination of the visual indicator 220 on the slider knob 210 is described in greater detail in previously-referenced U.S. Pat. No. 4,947,054.

Figure 8:
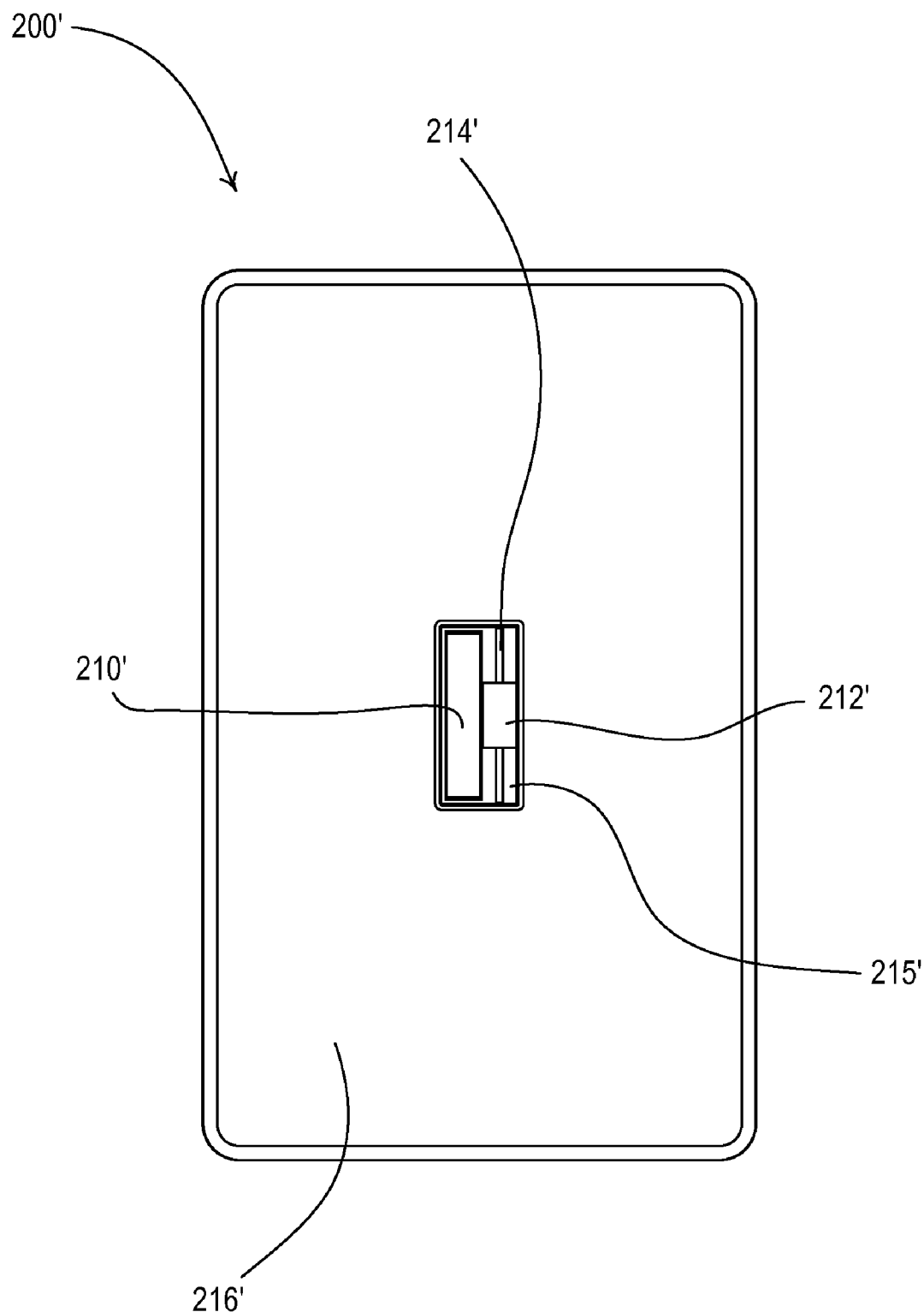
FIG. 8 is a front view of a traditional-opening dimmer switch for providing a visual indication representative of energy savings and usage information according to a third embodiment of the present invention.

FIG. 8 is a front view of a traditional-opening dimmer switch 200' for providing a visual indication representative of energy savings and usage information according to a third embodiment of the present invention. The dimmer switch 200' comprises a toggle actuator, such as a standard toggle switch or a rectangular pushbutton 210' (as shown in FIG. 8). The dimmer switch 200' also comprises an intensity adjustment actuator, such as a slider knob 212', which is adapted to slide along the length of an elongated slider slot 214' of a frame 215'. As shown in FIG. 8, the rectangular pushbutton 210', the slider knob 212', the slider slot 214', and the frame 215' are all provided in an opening of a traditional-style faceplate 216'. The pushbutton 210' is supported for inward translation with respect to the frame 215' in a sliding manner. Consecutive presses of the pushbutton 210' toggle the connected lighting load 104 on and off. Adjustment of the slider knob 212' along the slider slot 214' causes the dimmer switch 200' to adjust the amount of power delivered to the lighting load 104.

The dimmer switch 200' includes an internal source of illumination (e.g., an LED) for illuminating the pushbutton 210' and/or the slider slot 214' to provide the visual indication representative of energy savings and usage information. Specifically, the dimmer switch 200' illuminates the pushbutton 210' and the slider slot 214' the first color (i.e., green) when the position of the slider knob 212' is adjusted such that the intensity of the connected lighting load is less than or equal to the eco-level lighting intensity $L_{ECO}$. The dimmer switch 200' illuminates the pushbutton 210' and the slider slot 214' the second color (i.e., red) when the position of the slider knob 212' is adjusted such that the intensity of the connected lighting load is greater than the eco-level lighting intensity $L_{ECO}$. The assembly of the dimmer switch 200' to allow for illumination of the pushbutton 210' and the slider slot 214' is described in greater detail in commonly-assigned U.S. Pat. No. 7,745,750, issued Jun. 29, 2010, entitled DIMMER SWITCH HAVING AN ILLUMINATED BUTTON AND SLIDER SLOT, the entire disclosure of which is hereby incorporated by reference.

Figure 9A:
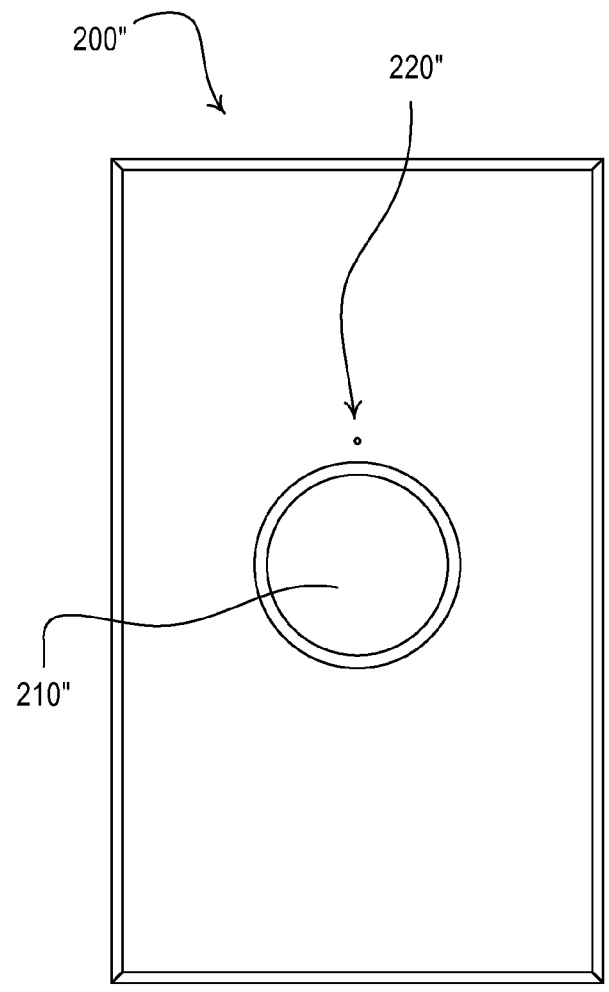
FIG. 9A is a front view of a rotary dimmer switch for providing a visual indication representative of energy savings and usage information according to a fourth embodiment of the present invention.
Figure 9B:
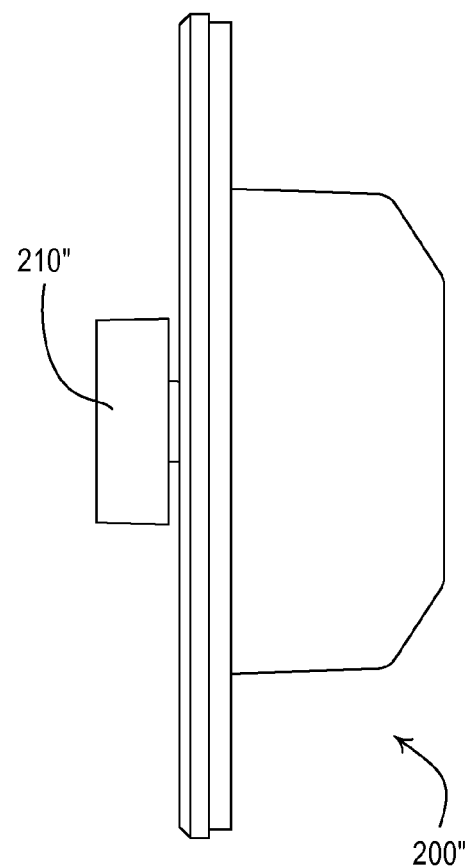
FIG. 9B is a right-side view of the rotary dimmer switch of FIG. 9A.

FIG. 9A is a front view and FIG. 9B is a right side view of a rotary dimmer switch 200" for providing a visual indication representative of energy savings and usage information according to a fourth embodiment of the present invention. The dimmer switch 200" comprises a rotary knob 210" and a single visual indicator 220", which is illuminated to provide the visual indication of energy savings and usage information of the dimmer switch in a similar manner as in the first embodiment. As shown in FIG. 9A, the visual indicator 220" is positioned above the rotary knob 210". Alternatively, the visual indicator 220" could be located at a position along the circumference of the rotary knob 210" that is representative of the value of the eco-level lighting intensity $L_{ECO}$. In addition, the rotary knob 210" could alternatively be illuminated as described in greater detail in commonly-assigned U.S. Pat. No. 3,864,561, issued Feb. 4, 1975, entitled DIMMER SWITCH WITH ILLUMINATED KNOB, the entire disclosure of which is hereby incorporated by reference.

The dimmer switch 200" of the fourth embodiment has a similar schematic diagram as the dimmer switch 100 of the first embodiment (as shown in FIG. 5). However, rather than including a dual linear potentiometer, the potentiometer 150 of the dimmer switch 200" of the fourth embodiment comprises a dual rotary potentiometer, having a circular resistive element and a circular conductive element. The rotary knob 210" is coupled to the rotary potentiometer, such that rotations of the rotary knob adjust the lighting intensity L of the lighting load 104 and cause the visual indicator 220" to be illuminated to provide the visual indication of energy savings and usage information of the dimmer switch 200" in a similar manner as in the first embodiment. In addition, the dimmer switch 200" of the fourth embodiment does not comprise the mechanical switch S20, but rather, the rotary potentiometer comprises an internal mechanical switch coupled in series between the hot terminal H and the junction of the triac 170 and the timing circuit 172, such that actuations of the rotary knob 210" to push the knob in towards the dimmer switch 200" cause the dimmer switch to toggle the connected lighting load 104. Alternatively, the internal mechanical switch of the potentiometer 150 could be opened when the rotary knob 210" is fully rotated to one of the two limits of the potentiometer to thus turn off the connected lighting load 104.

Figure 10:
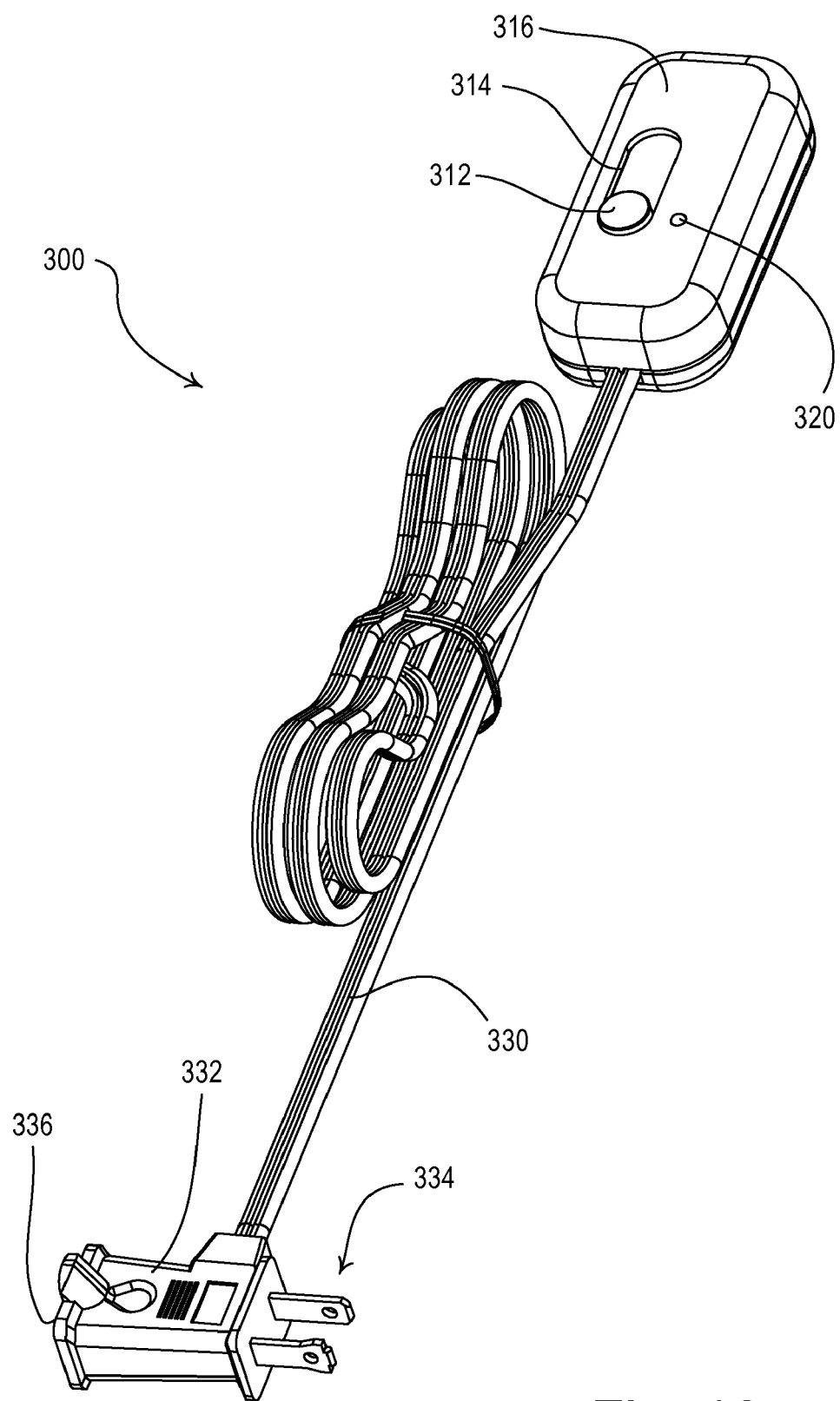
FIG. 10 is a perspective view of a tabletop dimmer switch for providing a visual indication representative of energy savings and usage information according to a fifth embodiment of the present invention.

FIG. 10 is a perspective view of a tabletop dimmer switch 300 for providing a visual indication representative of energy savings and usage information according to a fifth embodiment of the present invention. The tabletop dimmer switch 300 comprises a slider actuator 312 adapted to slide along an elongated slider slot 314 in an enclosure 316 that houses the electrical circuitry of the dimmer switch, which be described in greater detail below with reference to FIG. 11. The tabletop dimmer switch 300 further comprises a single visual indicator 320, which is illuminated to provide the visual indication of energy savings and usage information of the dimmer switch in a similar manner as in the first embodiment. The tabletop dimmer switch 300 comprises an electrical cord 330 that connects the enclosure 316 to an electrical connector 332. The electrical connector 332 comprises blades 334 that are adapted to be inserted into a standard electrical outlet (not shown) for electrically coupling the dimmer switch 300 to the AC power source 102. The electrical plug 332 also comprises a socket portion 336, which is adapted to receive the blades of a standard plug (e.g., from a table lamp) to thus control the amount of power delivered to the table lamp. An example of an enclosure for a tabletop dimmer switch is described in greater detail in commonly-assigned U.S. Pat. No. 5,499,930, issued Mar. 19, 1996, entitled IN-LINE DIMMER SWITCH, the entire disclosure of which is hereby incorporated by reference.

According to the fifth embodiment of the present invention, the dimmer switch 300 is operable to illuminate the visual indicator 320 a first color (e.g., green) when the amount of power being delivered to the lighting load 104 is less than or equal to a predetermined lower power threshold $TH_{ECO-}$ (e.g., approximately 83%), a second color (e.g., yellow) when the amount of power being delivered to the lighting load 104 is greater than the lower power threshold $TH_{ECO-}$ and less than a predetermined upper power threshold $TH_{ECO+}$ (e.g., approximately 87%), and a third color (e.g., red) when the amount of power being delivered to the lighting load 104 is greater than the upper power threshold $TH_{ECO+}$. Accordingly, by illuminating the visual indicator 320 green, then yellow, and then red as the intensity L of the lighting load 104 is increased, the dimmer switch 300 provides a "traffic light" warning that the dimmer switch and the lighting load are consuming more power than may be necessary.

Figure 11:
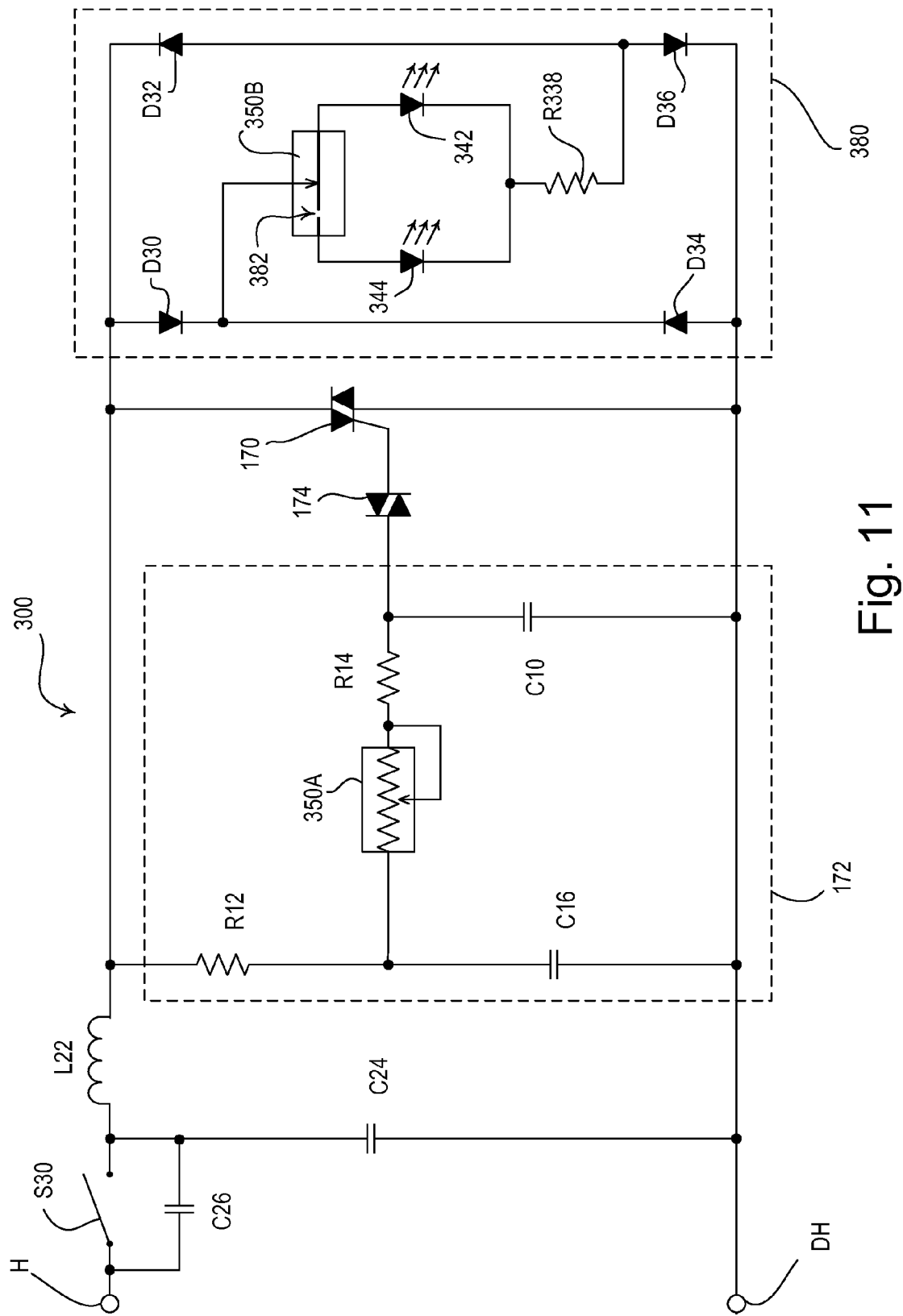
FIG. 11 is a simplified schematic diagram of the tabletop dimmer switch of FIG. 10.

FIG. 11 is a simplified schematic diagram of the tabletop dimmer switch 300 according to the fifth embodiment of the present invention. The electrical circuitry of the tabletop dimmer switch 300 of the fifth embodiment is very similar to the electrical circuit of the dimmer switch 100 of the first embodiment (as shown in FIG. 5). The tabletop dimmer switch 300 comprises a dual linear potentiometer 350 (FIG. 12) having two internal linear potentiometer portions 350A, 350B and a single shaft 352 (FIG. 12). The first potentiometer portion 350A forms part of the timing circuit 172, such that the intensity L of the lighting load 104 may be adjusted in response to the position of the slider actuator 312 and the shaft 352 of the potentiometer 350. When the slider actuator 312 is moved to one end of the slider slot 314 such that the lighting intensity L of the lighting load 104 is at the low-end lighting intensity $L_{LE}$, the slider actuator actuates the mechanical switch S30 inside the enclosure 316 to open the switch and turn the lighting load off. The tabletop dimmer switch 300 further comprises a visual indicator circuit 380 having a green LED 342 and a red LED 344 that are controlled to illuminate the visual indicator 320 green, yellow, and red. The green and red LEDs 342, 344 are coupled in parallel, with the parallel combination of the LEDs coupled in series with a single resistor R338 (e.g., having a resistance of approximately 30 kΩ). The second potentiometer portion 350B forms part of the visual indicator circuit 380, such that adjustments of the slider actuator 312 control the green LED 342 and the red LED 344 to illuminate the visual indicator 320 green, yellow, and red to provide the "traffic light" warning as will be described below.

FIG. 12A is an example electrical layout of the dual linear potentiometer 350. The potentiometer portions 350A, 350B have respective wipers 353A, 353B, which move together in response to movements of the single shaft 352. The first potentiometer portion 350A has a resistive element 354A that extends between first and second main terminals 355A, 356A of the first potentiometer portion and has, for example, a resistance of approximately 300 kΩ. The wiper 353A is electrically coupled between the resistive element 354A and a wiper trace 358A, which is electrically coupled to a wiper terminal 359A. As shown in FIG. 11, the wiper terminal 359A of the first potentiometer portion 350A is electrically coupled to the second main terminal 356A, such that the resistance between the first main terminal 355A and the wiper terminal 359A is variable in response to the position of the shaft 352. The firing capacitor C10 of the timing circuit 172 is operable to charge through the first potentiometer portion 350A, such that the rate at which the firing capacitor charges is dependent upon the position of the shaft 352 of the potentiometer 350 and the resistance between the first main terminal 355A and the wiper terminal 359A of the first potentiometer portion 350A.

Referring back to FIG. 12A, the second potentiometer portion 350B has a conductive element 354B that extends between first and second main terminals 355B, 356B and has, for example, a resistance of approximately zero Ω. The second wiper 353B is electrically coupled between the conductive element 354B and a wiper trace 358B, which is electrically coupled to a wiper terminal 359B. The conductive element 354B has a cut 382 near the second main terminal 356B. When the wiper 353B is close to the first main terminal 355B (i.e., to the right of the cut 382 as shown in FIG. 11), only the green LED 342 is coupled in series between the DC terminals of the rectifier bridge and is illuminated. When the wiper 353B is close to the second main terminal 356B (i.e., to the left of the cut 382 as shown in FIG. 11), only the red LED 344 is illuminated. The cut 382 is positioned along the length of the conductive element 354B of the second potentiometer portion 350B, such that the green LED 342 is illuminated when the present intensity L of the lighting load 104 is less than or equal to the lower power threshold $TH_{ECO-}$ and the red LED 344 is illuminated when the present intensity L of the lighting load 104 is greater than the upper power threshold $TH_{ECO+}$.

FIG. 12B is an enlarged view of the electrical layout of the potentiometer 350 of FIG. 12A showing the cut 382 in greater detail. The cut 382 extends through the conductive element 354B at an angle $\theta_{CUT}$ (e.g., approximately 41°) with respect to a longitudinal axis of the conductive element 354B. The conductive element 354B has a width $d_{WID}$ of, for example, approximately 1.7 mm. The cut 382 has dimensions $d_{CUT1}$ (e.g., approximately 1.3 mm), $d_{CUT2}$ (e.g., approximately 1.0 mm), and $d_{CUT3}$ (e.g., approximately 0.2 mm), such that there is an overlap $d_{OVLP}$ (e.g., approximately 0.2 mm) between the two portions of the conductive element 354B. When the wiper 353B is positioned overtop of the overlapped portions of the conductive element 354B at the gap 382, the wiper contacts both of the overlapped portions of the conductive element. Accordingly, both of the green LED 342 and the red LED 344 will be illuminated at the same time, thus causing the visual indicator 320 to be illuminated yellow when the present intensity L of the lighting load 104 is between the lower power threshold $TH_{ECO-}$ and the upper power threshold $TH_{ECO+}$.

Figure 13A:
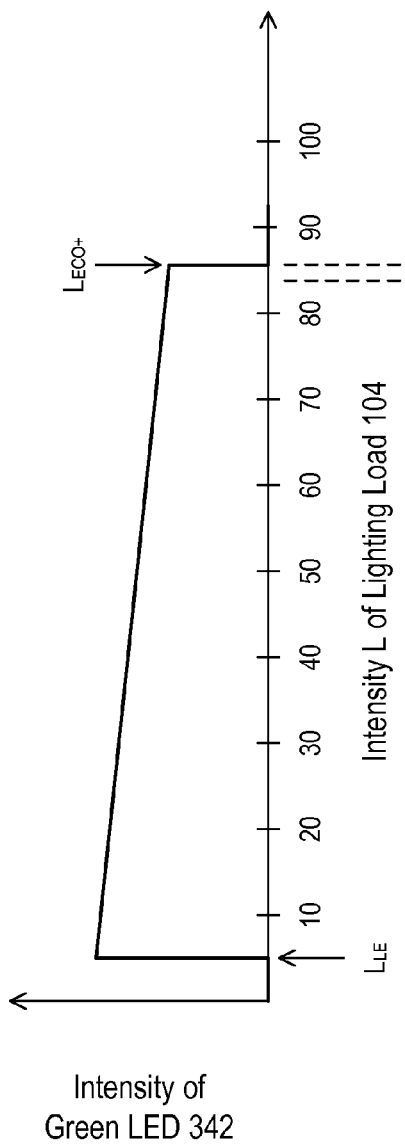
FIGS. 13A and 13B show example plots of intensities of a green light-emitting diode and a red light-emitting diode, respectively, with respect to the intensity of the lighting load of FIG. 11 according to the fifth embodiment of the present invention.
Figure 13B:
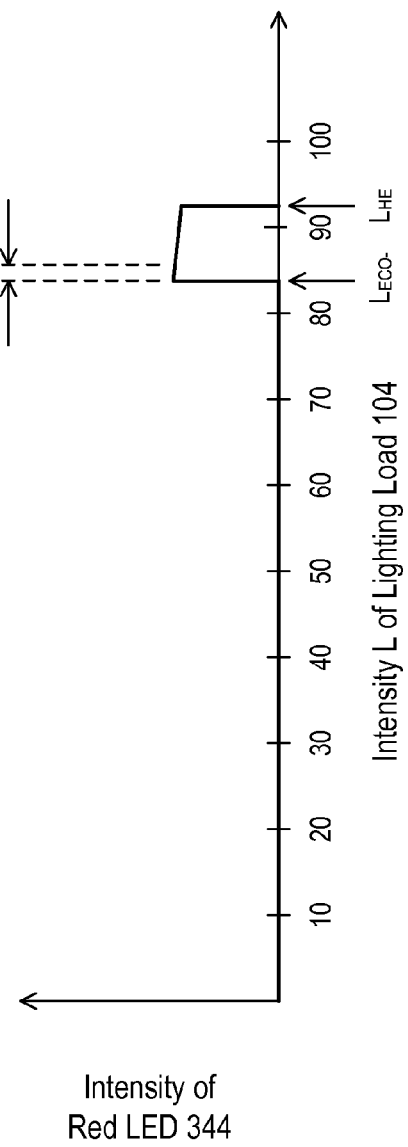

FIGS. 13A and 13B show example plots of the perceived intensities of the green LED 342 and the red LED 344, respectively, with respect to the present lighting intensity L of the lighting load 104 according to the fifth embodiment of the present invention. As in the first embodiment, both the green LED 342 and the red LED 344 are controlled to be off when the mechanical switch S30 is open and the lighting load 104 is off. At the low-end lighting intensity $L_{LE}$ of the lighting load 104 (i.e., approximately 5%), the intensity of the green LED 342 is illuminated at a maximum intensity, while the red LED 344 is not illuminated. As the intensity L of the lighting load 104 increases, the intensity of the green LED 342 decreases slightly. At the lower eco-level threshold intensity $L_{ECO-}$ (i.e., approximately 83%), the red LED 344 turns on, such that both LEDs are illuminated and the visual indicator 320 is illuminated to be yellow. When the present intensity L of the lighting load 104 is greater than the upper eco-level threshold intensity $L_{ECO+}$ (i.e., approximately 87%), the green LED 342 is turned off, such that only the red LED 344 is illuminated. According to the fifth embodiment of the present invention, when the intensity L of the lighting load 104 is between the lower eco-level threshold intensity $L_{ECO-}$ and the upper eco-level threshold intensity $L_{ECO+}$, the magnitudes of the green and red LEDs 342, 344 are approximately equal, such that both of the colors of the LEDs blend to illuminate the visual indicator 320 yellow.

Alternatively, the tabletop dimmer switch 300 of the fifth embodiment could illuminate the visual indicator 320 in a similar manner as the dimmer switch 100 of the first embodiment, i.e., to illuminate the visual indicator green when the present intensity L of the lighting load 104 is less than or equal to the eco-level lighting intensity $L_{ECO}$ (i.e., approximately 85%) and red when the present intensity L of the lighting load is greater than the eco-level lighting intensity $L_{ECO}$. In addition, the dimmer switches 100, 200, 200', 200" of the first through fourth embodiments could alternatively operate to provide the traffic light warning of the fifth embodiment.

Figure 14:
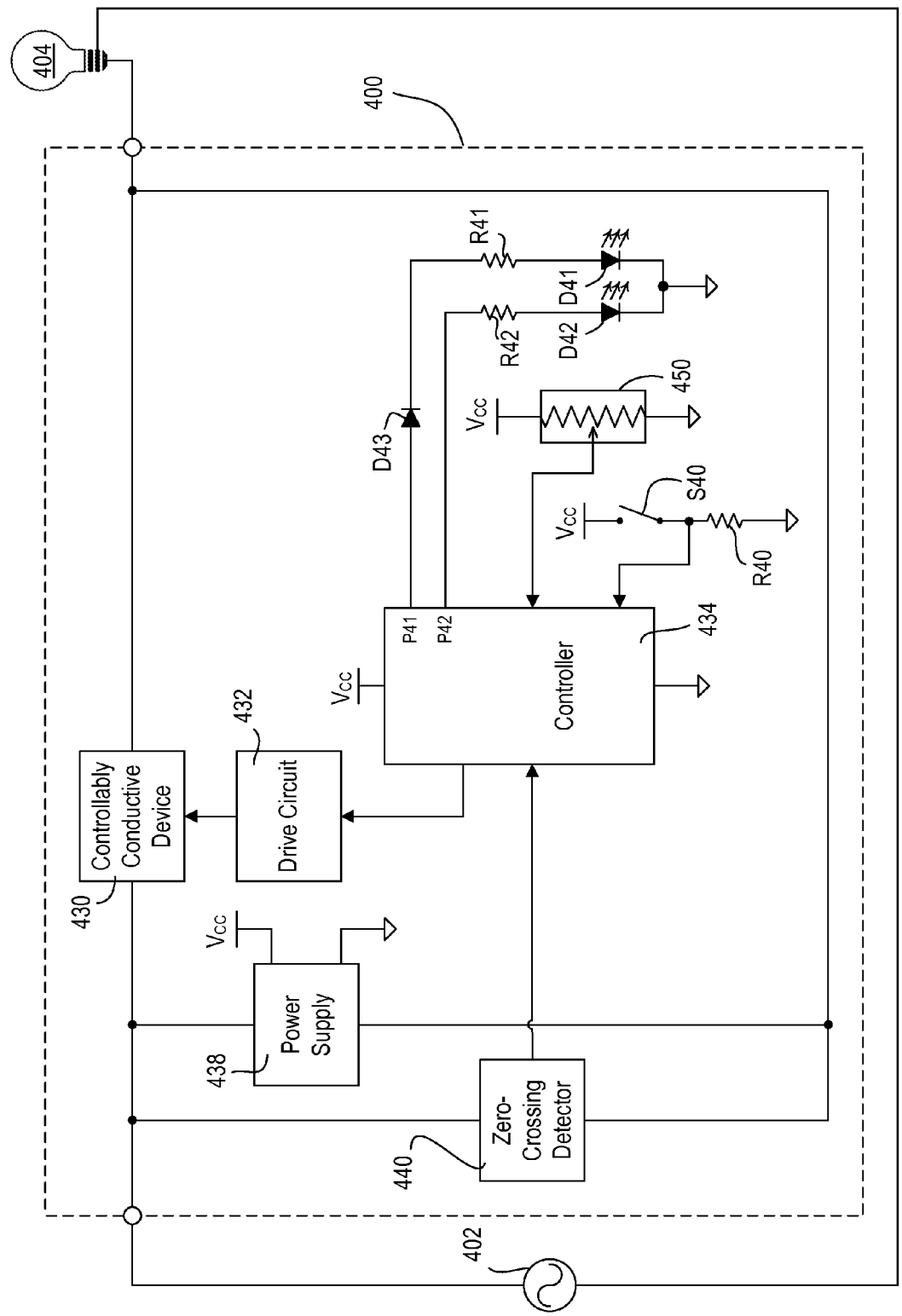
FIG. 14 is a simplified schematic diagram of a dimmer switch for providing a visual indication representative of energy savings and usage information according to a sixth embodiment of the present invention.

FIG. 14 is a simplified block diagram of a dimmer switch 400 according to a sixth embodiment of the present invention. The dimmer switch 400 may have a user interface identical to the dimmer switch 100 of the first embodiment (as shown in FIGS. 1 and 2), the dimmer switch 200 of the second embodiment (as shown in FIG. 7A), the dimmer switch 200' of the third embodiment (as shown in FIG. 8) or the dimmer switch 200" of the fourth embodiment (as shown in FIG. 9A). The dimmer switch 400 comprises a controllably conductive device 430 coupled in series electrical connection between an AC power source 402 and a lighting load 404 for control of the power delivered to the lighting load. The controllably conductive device 430 may comprise any suitable type of bidirectional semiconductor switch, such as, for example, a triac, a field-effect transistor (FET) in a rectifier bridge, or two FETs in anti-series connection. The controllably conductive device 430 includes a control input coupled to a drive circuit 432. The input provided by the drive circuit 432 to the control input will render the controllably conductive device 430 conductive for a portion of each half-cycle, which in turn controls the power supplied to the lighting load 404.

The drive circuit 432 provides control inputs to the controllably conductive device 430 in response to command signals from a controller 434. The controller 434 may be implemented as a microcontroller, a microprocessor, a programmable logic device (PLD), an application specific integrated circuit (ASIC), a field-programmable gate array (FPGA), or any suitable processing device. The controller 434 is operable to turn the lighting load 404 off and on in response to an input received from a switch S40, which is the electrical representation of the rocker switch 110. The controller 434 is operable to adjust the intensity of the lighting load 404 in response to a voltage provided by a potentiometer 450, which has a shaft connected to, for example, the slider knob 112. A power supply 438 generates a DC supply voltage $V_{CC}$ (e.g., 5V) for powering the controller 434 and other low-voltage circuitry of the dimmer switch 400.

A zero-crossing detector 440 is coupled to the controller 434 and determines the zero-crossings of the input AC waveform from the AC power supply 402. A zero-crossing is defined as the time at which the AC supply voltage transitions from positive to negative polarity, or from negative to positive polarity, at the beginning of each half-cycle. The controller 434 provides the control inputs to the drive circuit 432 to operate the controllably conductive device 430 (i.e., to provide voltage from the AC power supply 402 to the lighting load 404) at predetermined times relative to the zero-crossing points of the AC waveform.

The dimmer switch 400 comprises a red LED D41 and a green LED D42 that are positioned to illuminate, for example, the visual indicator 120 of the dimmer 100. For example, the red LED D41 may comprise part number APTB1612SURKCGKC-F01, manufactured by Kingbright Corp., while the green LED D42 may comprise part number TLMX2100, manufactured by Vishay Semiconductors. The controller 434 is coupled to the LEDs D41, D42 via respective resistors R41, R42 (e.g., both having resistances of approximately 470Ω) and a diode D43. To illuminate one of the LEDs D41, D42, the controller 434 drives a respective pin P41, R42 high (i.e., to approximately the DC supply voltage $V_{CC}$) to conduct current through the respective resistor R41, R42 and the LED. The controller 434 is operable to individually illuminate the red and green LEDs D41, D42 to illuminate the visual indicator 120 red and green, respectively. The diode D43 accounts for the difference in the voltage and current characteristics of the red LED D41 as compared to the green LED D42, such that the intensities of the LEDs are comparable when illuminated. Alternatively, the diode D43 could be omitted and the resistor R41 could have a different resistance than the resistor R42 to account for the differences in the voltage and current characteristics of the LEDs D41, D42.

Figure 15:
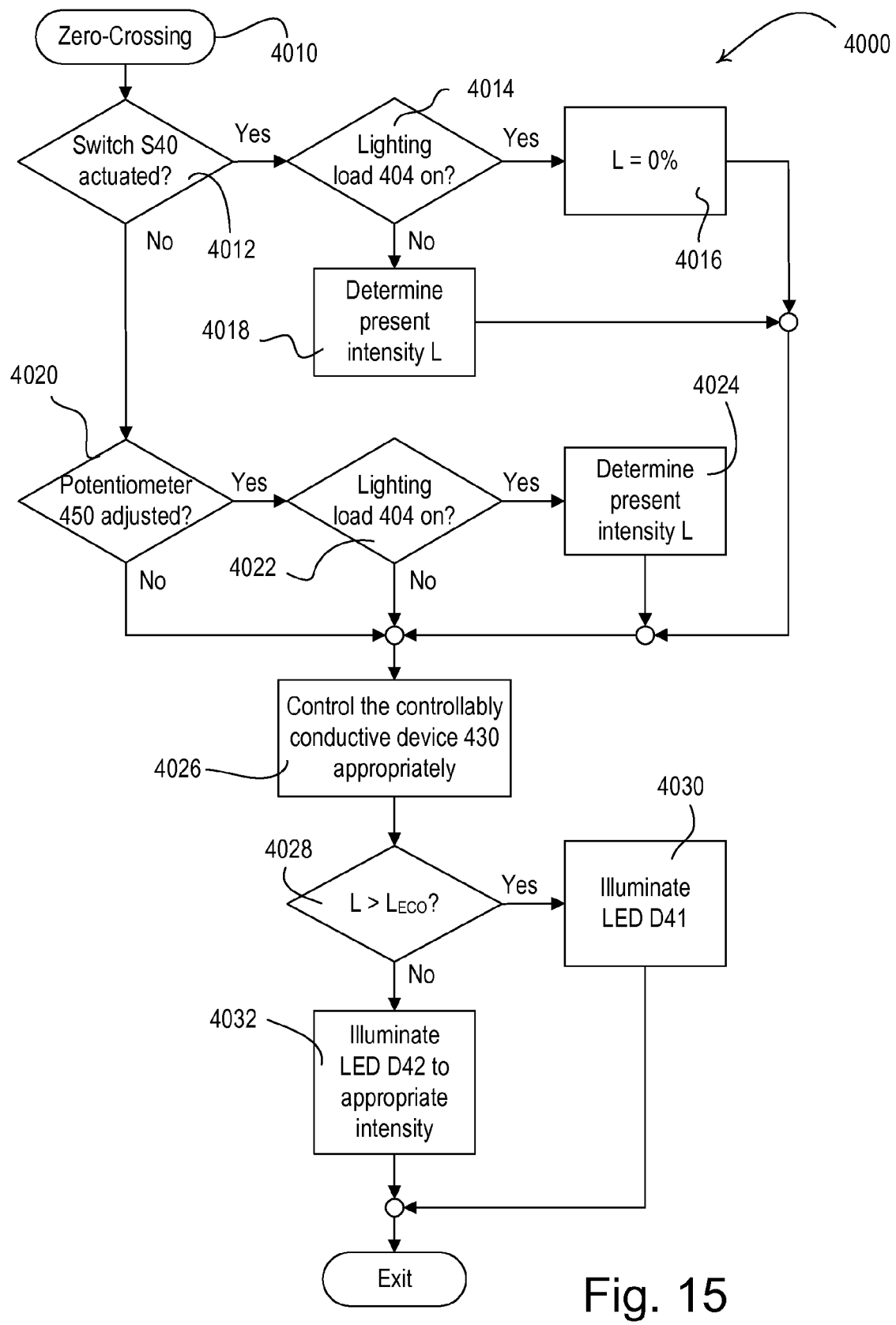
FIG. 15 is a simplified flowchart of a control procedure executed periodically by a controller of the dimmer switch of FIG. 14 according to the sixth embodiment.

FIG. 15 is a simplified flowchart of a control procedure 4000 executed periodically by the controller 434 of the dimmer switch 400 according to the sixth embodiment of the present invention. The control procedure 4000 is executed by the controller 434, for example, once every half-cycle of the AC power source 402 when the zero-crossing detector 440 detects a zero-crossing at step 4010. If the controller 434 receives an input from the switch S40 at step 4012 (i.e., the rocker switch 110 was actuated) and the lighting load 104 is presently on at step 4014, the controller 434 controls the lighting intensity L of the lighting load to be off at step 4016. If the lighting load 404 is off at step 4014, the controller 434 sets the present intensity L in response to the voltage provided by the potentiometer 450 (e.g., the position of the slider knob 112) at step 4018. If the rocker switch 110 is not actuated at step 4012, a determination is made as to whether the position of the slider knob 112 has been adjusted at step 4020. If the potentiometer 450 has been adjusted at step 4020 and the lighting load is off at step 4022, the controller 434 does not turn the lighting load 404 on. However, if the potentiometer 450 has been adjusted at step 4020 and the lighting load is on at step 4022, the controller 434 sets the present intensity L of the lighting load 404 in response to the voltage provided by the potentiometer 450 at step 4024. After the controller 434 appropriately determines the lighting intensity L of the lighting load 404 (at steps 4016, 4018, 4024), the controller directs the controllably conductive device 430 accordingly at step 4026.

If the present intensity L is greater than the eco-level intensity $L_{ECO}$ (i.e., 85%) at step 4028, the controller 434 controls the red LED D41 to illuminate the visual indicator 120 red at step 4030, before the control procedure 4000 exits. If the present intensity L is less than or equal to the eco-level intensity $L_{ECO}$ at step 4028, the controller 434 controls the intensity of the green LED D42 at step 4032 to illuminate the visual indicator 120 to an appropriate intensity as a function of the present intensity L. In other words, when the present intensity L is less than or equal to the eco-level intensity $L_{ECO}$, the intensity of the green LED D42 increases as the present intensity L decreases, and vice versa. The controller 434 is operable to adjust the intensity of the green LED D42 by pulse-width modulating the voltage supplied at the port P42. Additionally, when the lighting load 404 is off, the controller 434 may control the green LED D42 to be illuminated dimly to provide a nightlight feature.

Figure 16:
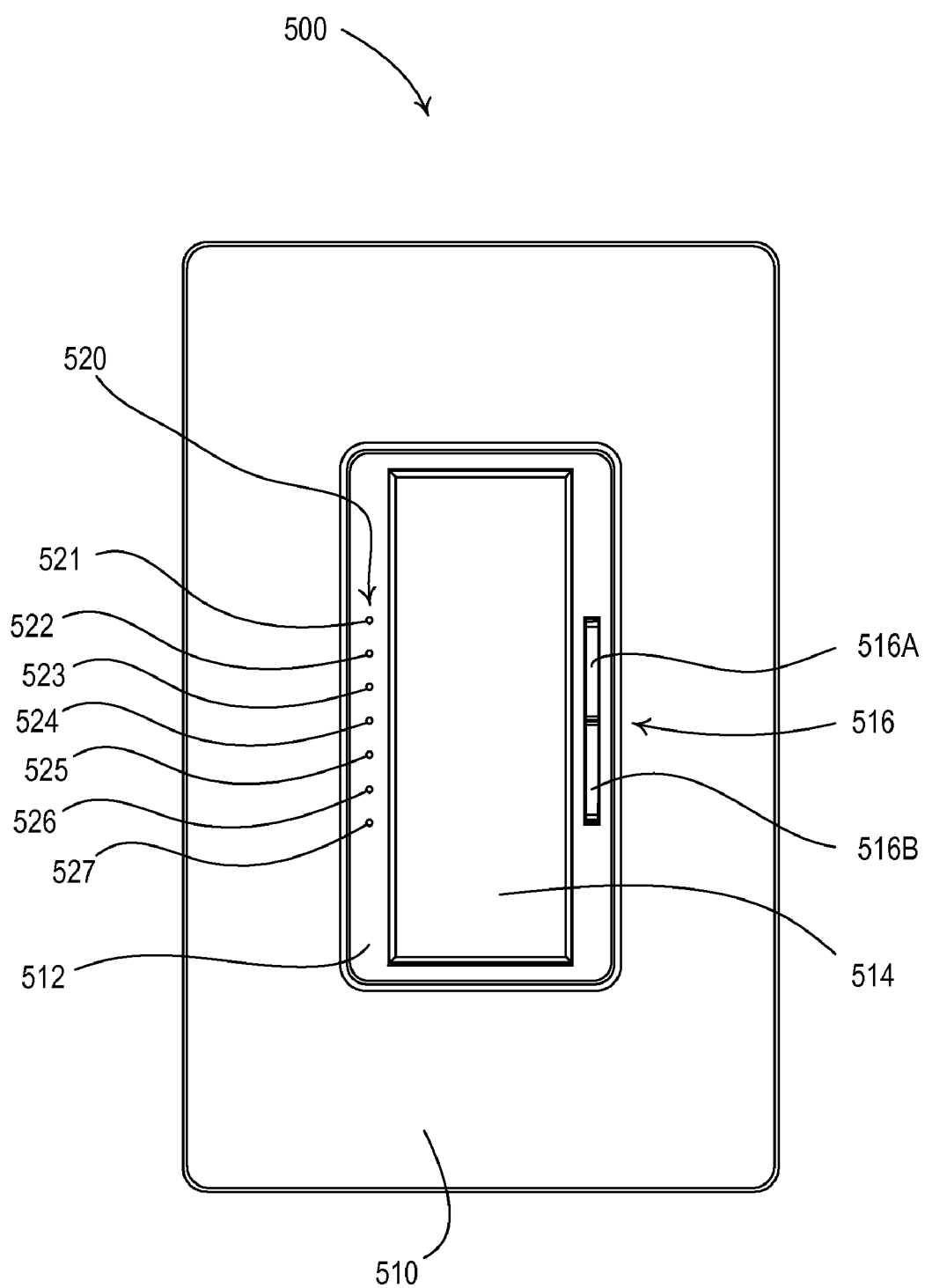
FIG. 16 is a front view of a "smart" dimmer switch that provides a visual indication representative of energy savings and usage information according to a seventh embodiment of the present invention.

FIG. 16 is a front view of a "smart" dimmer switch 500, which provides a visual indication representative of energy savings and usage information according to a seventh embodiment of the present invention. The dimmer switch 500 is adapted to be wall-mounted in a standard electrical wallbox. Alternatively, the dimmer switch 500 could comprises a tabletop dimmer switch (i.e., connected between an electrical outlet and a tabletop or floor lamp) or a screw-in lamp dimmer switch (i.e., connected between a lamp socket of a tabletop or floor lamp and the actual light bulb). The dimmer switch 500 is operable to be coupled in series electrical connection between an AC power source 502 (FIG. 17) and an electrical lighting load 504 (FIG. 17) for controlling the amount of power delivered to the lighting load. As with the dimmer switch 100 of the first embodiment of the present invention, the smart dimmer switch 500 of the seventh embodiment is operable to control the present intensity L of the lighting load between the low-end lighting intensity $L_{LE}$ and the high-end lighting intensity $L_{HE}$. An example of a smart dimmer switch is described in greater detail in commonly-assigned U.S. Pat. No. 5,248,919, issued Sep. 29, 1993, entitled LIGHTING CONTROL DEVICE, the entire disclosure of which is hereby incorporated by reference.

The dimmer switch 500 comprises a faceplate 510 and a bezel 512 received in an opening of the faceplate. The dimmer switch 500 comprises a user interface having a control actuator 514 and an intensity adjustment actuator 516 (e.g., a rocker switch). Actuations of the control actuator 514 toggle, i.e., alternately turn off and on, the connected lighting load 504. The dimmer switch 500 may be programmed with a preset lighting intensity $L_{PRST}$ (i.e., a "favorite" intensity level), such that the dimmer switch is operable to control the present intensity L of the lighting load 504 to the preset intensity when the lighting load is turned on by an actuation of the control actuator 514. Actuations of an upper portion 516A or a lower portion 516B of the intensity adjustment actuator 516 respectively increase or decrease the amount of power delivered to the lighting load 504 and thus increase or decrease the present intensity L of the lighting load.

According to the seventh embodiment of the present invention, the dimmer switch 500 includes a visual display comprising a linear array 520 of visual indicators 521-527. For example, the linear array 520 of visual indicators 421-427 are arranged vertically on the left side of the bezel 512. The visual indicators 521-527 are illuminated by respective LEDs D51-D57 (FIG. 17), which are mounted to a printed circuit board (not shown) inside the dimmer switch 500. A light pipe (not shown) conducts the light from the LEDs D51-D57 to the respective visual indicators 521-527 on the bezel 512 of the dimmer switch 500. The dimmer switch 500 illuminates the linear array 520 of visual indicators 521-527 to provide feedback of the present lighting intensity L of the lighting load 504. Specifically, the dimmer switch 500 illuminates one of the LEDs D51-D57 that is representative of the present lighting intensity L of the lighting load 504. For example, if the dimmer switch 500 is controlling the lighting load 504 to a lighting intensity L of 50%, the dimmer switch controls the middle LED D54 to illuminate the middle visual indicator 524, since this status indicator is at the midpoint of the linear array 520. When the lighting load 504 is off, the dimmer switch 500 illuminates all of the visual indicators 521-527 dimly to provide a nightlight feature.

Alternatively, the dimmer switch 500 could illuminate the linear array 520 of visual indicators 521-527 to provide feedback of the present amount of power being consumed by the lighting load 504 as a percentage of the maximum possible amount of power $P_{MAX}$ that can be consumed by the load. The dimmer switch 500 is operable to determine the present amount of power being consumed by the lighting load 504, for example, by a using a look-up table, such as Table 1 shown above.

The linear array 520 of visual indicators 521-527 are illuminated to represent energy saving information of the dimmer switch 500 and the lighting load 504. The dimmer switch 500 illuminates the visual indicators 521-527 in a first manner when the present intensity L of the lighting load 504 is less than or equal to the eco-level intensity $L_{ECO}$ (e.g., approximately 85% of the maximum possible intensity $L_{MAX}$ of the lighting load 504). The dimmer switch 500 illuminates one of the visual indicators (e.g., the top visual indicator 521) in a second manner when the present intensity L of the lighting load 504 is greater than the eco-level intensity $L_{ECO}$. According to the seventh embodiment of the present invention, the dimmer switch 500 only illuminates one of the visual indicators 522-527 other than the topmost visual indicator 521 in the first manner when the present intensity L of the lighting load 504 is less than or equal to the eco-level intensity $L_{ECO}$. For example, the dimmer switch 500 may illuminate the top visual indicator 521 a first color (e.g., red) when the present intensity L of the lighting load 504 is greater than the eco-level intensity $L_{ECO}$, and may illuminate one of the other visual indicators 522-527 a second color (e.g., green) when the present intensity L the lighting load 504 is less than or equal to the eco-level intensity $L_{ECO}$.

Alternatively, the dimmer switch 500 may illuminate the top visual indicator 521 a different color (i.e., blue, orange, or yellow) when the present intensity L of the lighting load 504 is greater than the eco-level intensity $L_{ECO}$. Further, the dimmer switch 500 could alternatively illuminate the visual indicators 521-527 multiple colors to visually express the amount of power presently being consumed by the lighting load 504. For example, the top visual indicator 521 could be red, the second-highest visual indicator 522 could be orange, the third-highest visual indicator 523 could be amber, the next visual indicator 524 could be yellow, and the other visual indicators 525-527 could be green.

In addition, the dimmer switch 500 could cause the top visual indicator 521 to blink when the present intensity L of the lighting load 504 is greater than the eco-level intensity $L_{ECO}$, and to constantly illuminate one of the other visual indicators 522-527 (to be non-blinking) when the present intensity L of the lighting load 504 is less than or equal to the eco-level intensity $L_{ECO}$. Further, the dimmer switch 500 could optionally generate a sound when the lighting intensity L is equal to or greater than the eco-level intensity $L_{ECO}$ (or when the lighting intensity L has just been adjusted to be greater than the eco-level intensity $L_{ECO}$). Examples of dimmer switches that are able to generate sounds are described in greater detail in commonly-assigned U.S. Pat. No. 7,608,948, issued Oct. 27, 2009, entitled TOUCH SCREEN WITH SENSORY FEEDBACK, and U.S. patent application Ser. No. 12/033,329, filed Feb. 19, 2008, entitled SMART LOAD CONTROL DEVICE HAVING A ROTARY ACTUATOR, the entire disclosures of which are hereby incorporated by reference.

Figure 17:
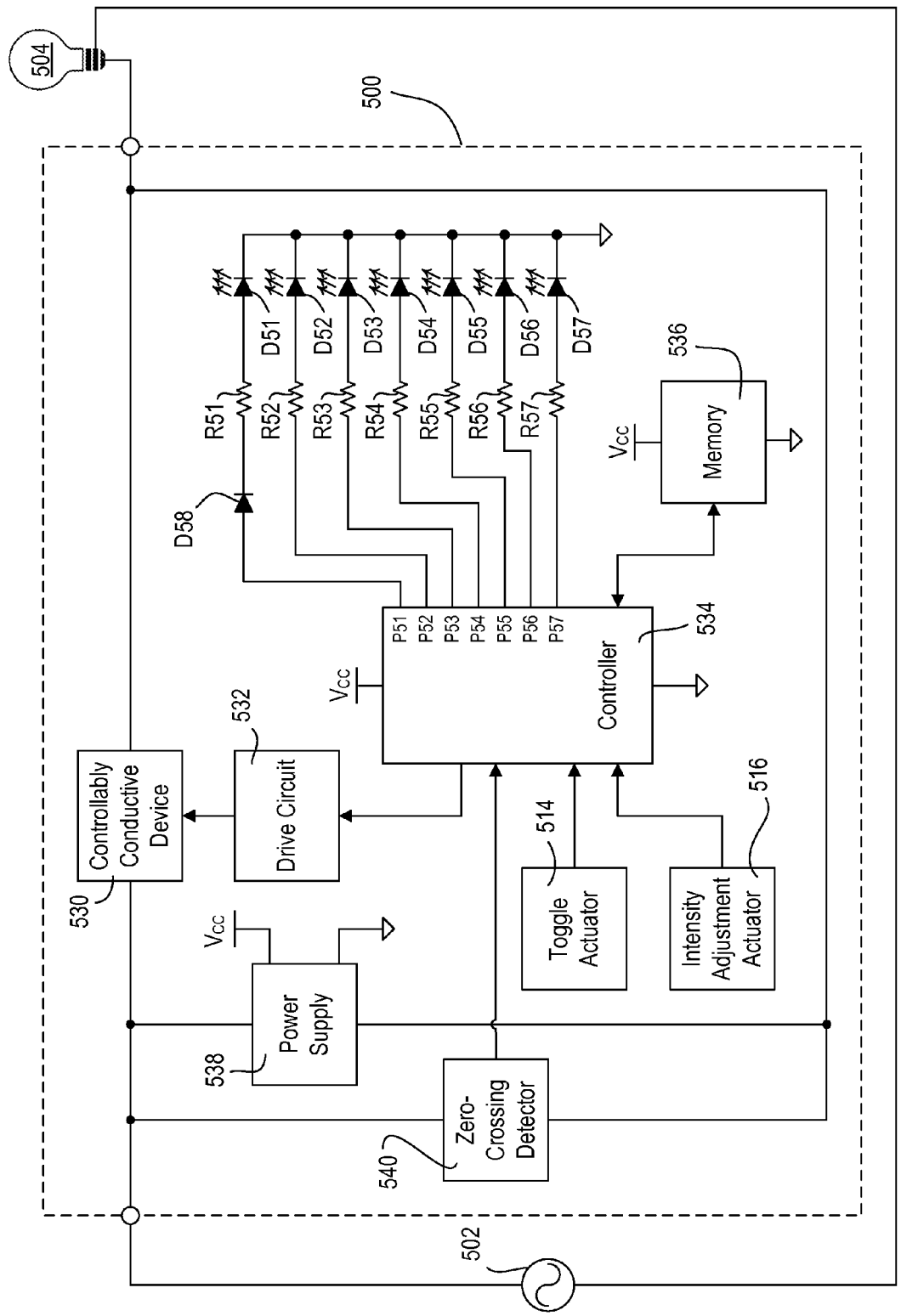
FIG. 17 is a simplified block diagram of the smart dimmer switch of FIG. 16.

FIG. 17 is a simplified block diagram of the dimmer switch 500. The dimmer switch 500 comprises a controllably conductive device 530 for control of the power delivered from the AC power source 502 to the lighting load 504. A controller 534 is coupled to a control input of the controllably conductive device 530 via a drive circuit 532. The controller 532 is operable to render the controllably conductive device 530 conductive for a portion of each half-cycle, for thus controlling the amount of power delivered to the lighting load 504. The controller 534 may be implemented as a microcontroller, a microprocessor, a programmable logic device (PLD), an application specific integrated circuit (ASIC), a field-programmable gate array (FPGA), or any suitable processing device. The controller 534 provides the control inputs to the drive circuit 532 to operate the controllably conductive device 530 in response to the zero-crossing information received from a zero-crossing detector 540. The controller 534 also receives inputs from the control actuator 514 and the intensity adjustment actuator 516. The controller 534 is also coupled to a memory 536 for storage of the preset lighting intensity $L_{PRST}$ of lighting load 504. The controller 534 may also include an internal volatile memory. A power supply 538 generates a DC supply voltage $V_{CC}$ (e.g., 5V) for powering the controller 534, the memory 536, and other low-voltage circuitry of the dimmer switch 500.

As previously mentioned, the controller 534 controls the LEDs D51-D57 to illuminate the respective visual indicators 521-527 on the bezel 512, where the top LED D51 is a first color (i.e., red) and the other LEDs D52-D57 are a second color (i.e., green). The LEDs D51-D57 are coupled in series with respective current-limiting resistors R51-R57 (e.g., all having resistances of 470Ω). To illuminate one of the LEDs D51-D57, the controller 534 drives a respective pin P51-P57 high (i.e., to approximately the DC supply voltage $V_{CC}$) to conduct current through the respective resistor R51-R57 and the LED. The top LED D51 is also coupled in series with a diode D58, such that less than the DC supply voltage $V_{CC}$ (e.g., 4.3V) is provided across the series combination of the resistor R51 and the LED D51. The diode D58 accounts for the difference in the voltage and current characteristics of the first LED D51 as compared to the other LEDs D52-D57, such that the intensities of the LEDs are comparable when illuminated. Alternatively, the diode D58 could be omitted and the resistor R51 could have a different resistance than the resistors R52-R57 to account for the differences in the voltage and current characteristics of the LEDs D51-D57.

Figure 18A:
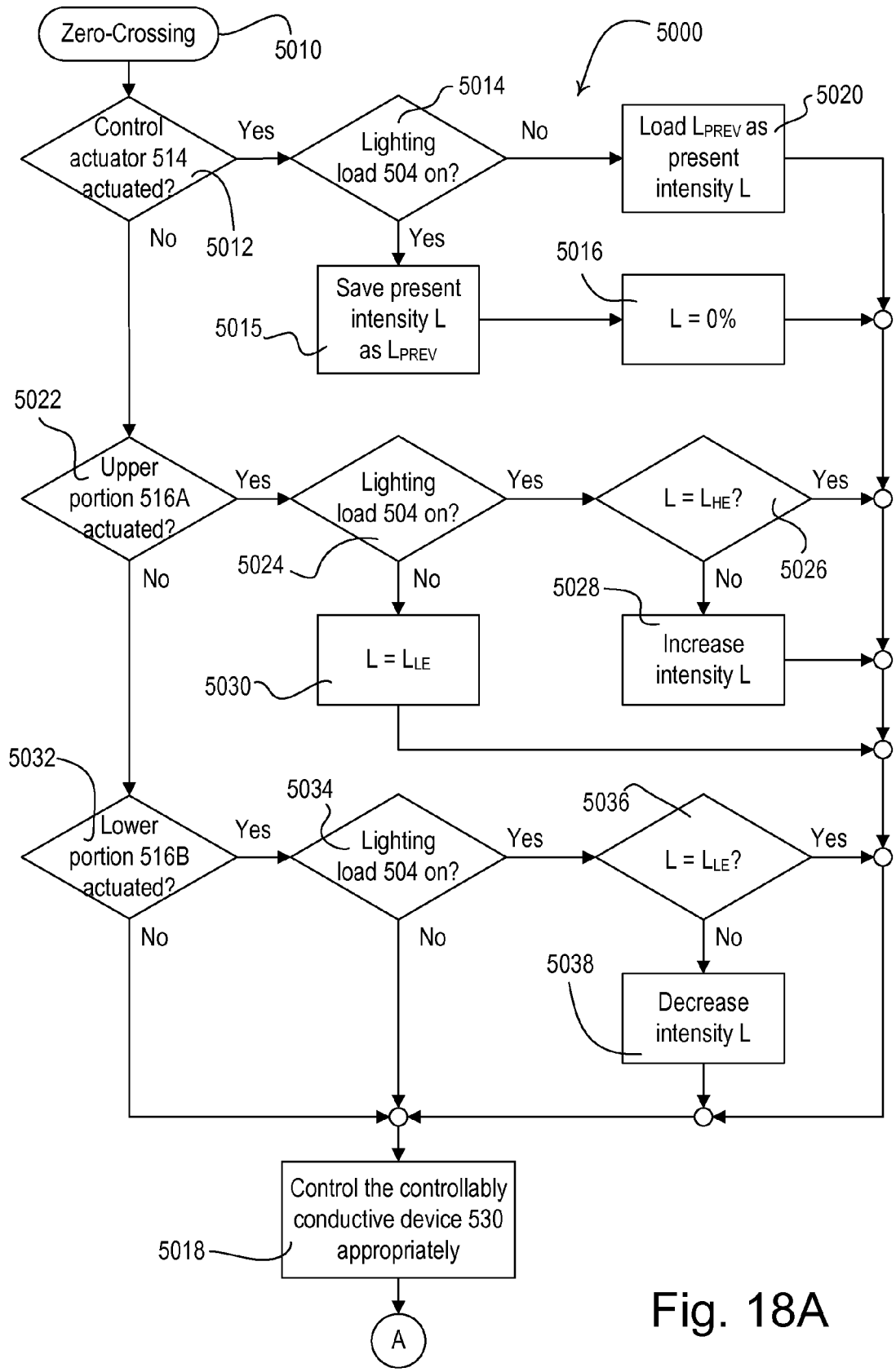
FIGS. 18A and 18B are simplified flowcharts of a control procedure executed periodically by a controller of the dimmer switch of FIG. 16 according to the seventh embodiment.
Figure 18B:
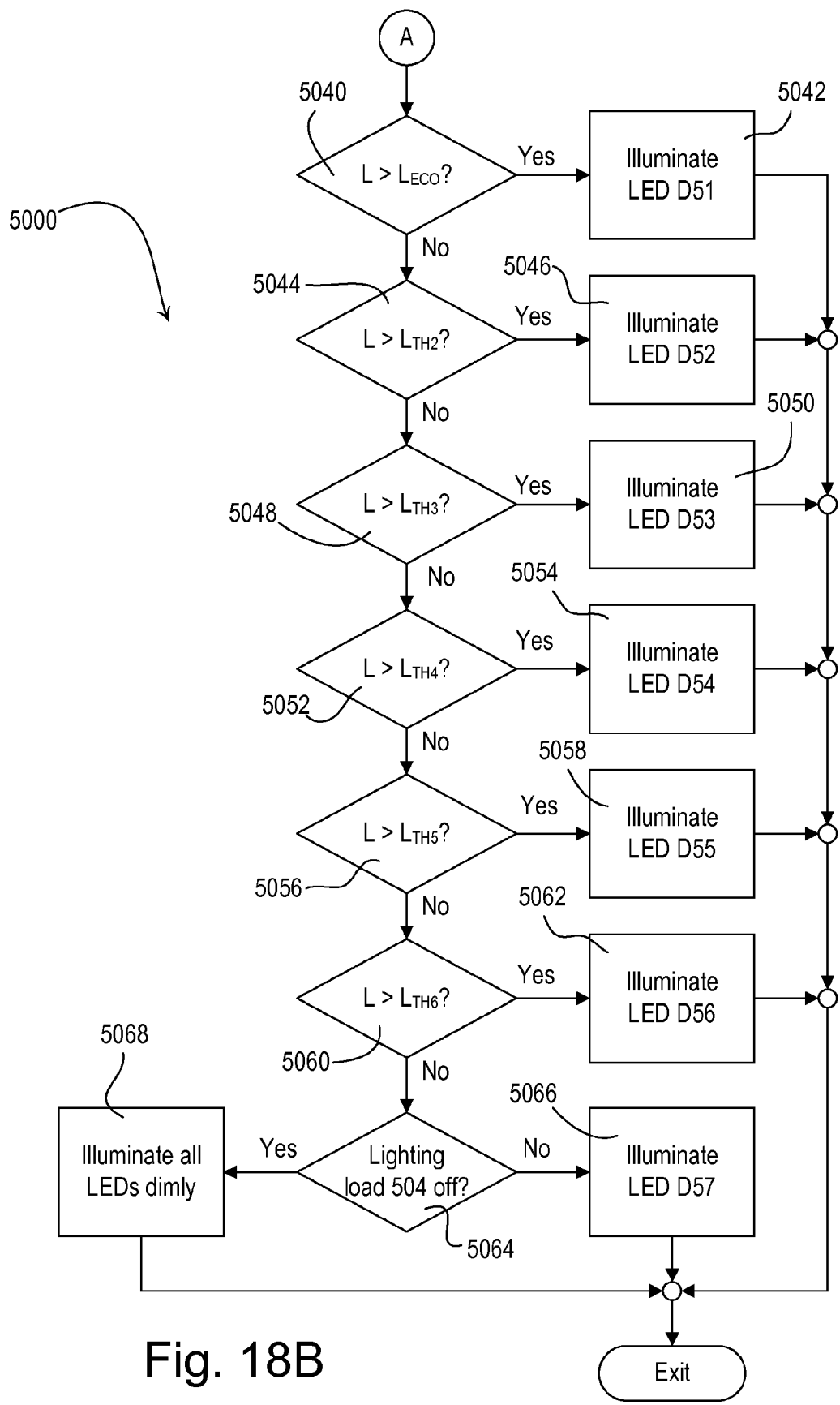

FIGS. 18A and 18B are simplified flowcharts of a control procedure 5000 executed periodically by the controller 534, e.g., once every half-cycle of the AC power source 502 when the zero-crossing detector 540 detects a zero-crossing at step 5010. If the controller 534 determines that the control actuator 514 has been actuated at step 5012, a determination is made at step 5014 as to whether the lighting load 504 is presently on. If the lighting load 504 is on, the controller 534 stores the present lighting intensity L as a previous lighting intensity $L_{PREV}$ in the memory 536 (or in the internal memory) at step 5015 (such that the previous lighting intensity $L_{PREV}$ may be recalled when the lighting load 504 is turned back on). The controller 534 then sets the present lighting intensity L as off (i.e., 0%) in the memory 536 at step 5016, and controls the controllably conductive device 530 appropriately at step 5018 (i.e., does not render the controllably conductive device conductive during the present half-cycle). If the lighting load 504 is off at step 5014, the controller 534 loads the previous lighting intensity $L_{PREV}$ from the memory 536 as the present lighting intensity L at step 5020, and controls the controllably conductive device 530 to turn on to the appropriate lighting intensity at step 5018 (i.e., renders the controllably conductive device conductive at the appropriate time during the present half-cycle).

If the controller 534 determines that the control actuator 514 has not been actuated at step 5012, a determination is made as to whether the upper portion 516A of the intensity adjustment actuator 516 has been actuated at step 5022. If the upper portion 516A has been actuated at step 5022, the lighting load 504 is on at step 5024, and the present lighting intensity L is not at the high-end intensity $L_{HE}$ at step 5026, the controller 534 increases the present lighting intensity L by a predetermined increment (e.g., 1%) at step 5028, and controls the controllably conductive device 530 at step 5018. If the present lighting intensity L of the lighting load 504 is at the high-end intensity $L_{HE}$ at step 5026, the controller 534 does not change the lighting intensity, such that the present lighting intensity L is limited to the high-end intensity $L_{HE}$. If the upper portion 516A is being actuated at step 5022 and the lighting load 504 is not on at step 5024, the lighting intensity L of the lighting load 504 is adjusted to the low-end intensity $L_{LE}$ at step 5030, and the controllably conductive device 530 is controlled appropriately at step 5018 (i.e., the lighting load is turned on to the low-end intensity $L_{LE}$).

If the upper portion 516A of the intensity adjustment actuator 516 has not been actuated at step 5022, but the lower portion 516B has been actuated at step 5032, a determination is made at step 5034 as to whether the lighting load 504 is on. If the lighting load 504 is on at step 5034 and the lighting intensity L is not at the low-end intensity $L_{LE}$ at step 5036, the lighting intensity L is decreased by a predetermined increment (e.g., 1%) at step 5038. If the lighting intensity L is at the low-end intensity $L_{LE}$ at step 5036, the controller 534 does not change the lighting intensity L, such that the lighting intensity remains at the low-end intensity $L_{LE}$. If the lighting load 504 is not on at step 5034, the lighting intensity L is not changed (i.e., the lighting load 504 remains off) and the controllably conductive device 530 is not rendered conductive at step 5018.

If the control actuator 514 has not been actuated at step 5012, the upper portion 516A of the intensity adjustment actuator 516 has not been actuated at step 5022, and the lower portion 516B of the intensity adjustment actuator has not been actuated at step 5032, the controllably conductive device 530 is simply controlled appropriately at step 5018.

Referring to FIG. 18B, the controller 534 now controls the LEDs D51-D57 to appropriately illuminate the visual indicators 521-527 in response to the present intensity L of the lighting load 504 stored in the memory 536. Specifically, if the present lighting intensity L is greater than the predetermined eco-level intensity $L_{ECO}$ (i.e., 85% of the maximum lighting intensity $L_{MAX}$) at step 5040, the controller 534 drives the pin P51 high to illuminate only the LED D51 constantly at step 5042 (to thus illuminate the top visual indicator 521 red). If the present intensity L is less than or equal to the predetermined eco-level lighting intensity $L_{ECO}$ at step 5040, but is greater than a second threshold lighting intensity $L_{TH2}$ (e.g., 70%) at step 5044, the controller 534 illuminates only the LED D52 constantly at step 5046 (to thus illuminate the visual indicator 522 green). If the present lighting intensity L is greater than a third threshold lighting intensity $L_{TH3}$ (e.g., 55%) at step 5048, a fourth threshold lighting intensity $L_{TH4}$ (e.g., 40%) at step 5052, a fifth threshold lighting intensity $L_{TH5}$ (e.g., 25%) at step 5056, or a sixth threshold lighting intensity $L_{TH6}$ (e.g., 10%) at step 5060, the controller 534 respectively illuminates the LED D53 at step 5050, the LED D54 at step 5054, the LED D55 at step 5058, or the LED D56 at step 5062. If the present lighting intensity L is less than or equal to the sixth threshold lighting intensity $L_{TH6}$ at step 5060, but is the lighting load 504 is not off at step 5064, the controller 534 illuminates the LED D57 (to thus illuminate the lowest visual indicator 527 green) at step 5066. If the lighting load 504 is off at step 5064, the controller 534 illuminates all of the green LEDs (i.e., LEDs D52-D57) dimly at step 5068 to provide the nightlight, for example, by providing pulse-width modulated (PWM) voltages on the pins P52-P57. After appropriately controlling the LEDs D51-D57, the control procedure 5000 exits. The control procedure 5000 is executed by the controller 534 once again at the next zero-crossing of the AC line voltage.

Alternatively, the dimmer switch 500 may be operable to "fade" the lighting intensity L of the lighting load 504 to be less than or equal to the predetermined eco-level lighting intensity $L_{ECO}$ if the lighting intensity L is controlled to be greater than the eco-level threshold. Fading of the lighting intensity L is defined as dimming or adjusting the lighting intensity L over a predetermined period of time. For example, if a user actuates the upper portion 516A of the intensity adjustment actuator 516 to increase the lighting intensity L above the predetermined eco-level lighting intensity $L_{ECO}$, the controller 534 may slowly decrease (i.e., fade) the lighting intensity L to be equal to the predetermined eco-level lighting intensity $L_{ECO}$ over a period of thirty minutes. Before beginning to fade the lighting intensity L towards the predetermined eco-level lighting intensity $L_{ECO}$, the controller 534 could remain at the lighting intensity that is above the eco-level lighting intensity $L_{ECO}$ for a period of time, e.g., five minutes.

Figure 19:
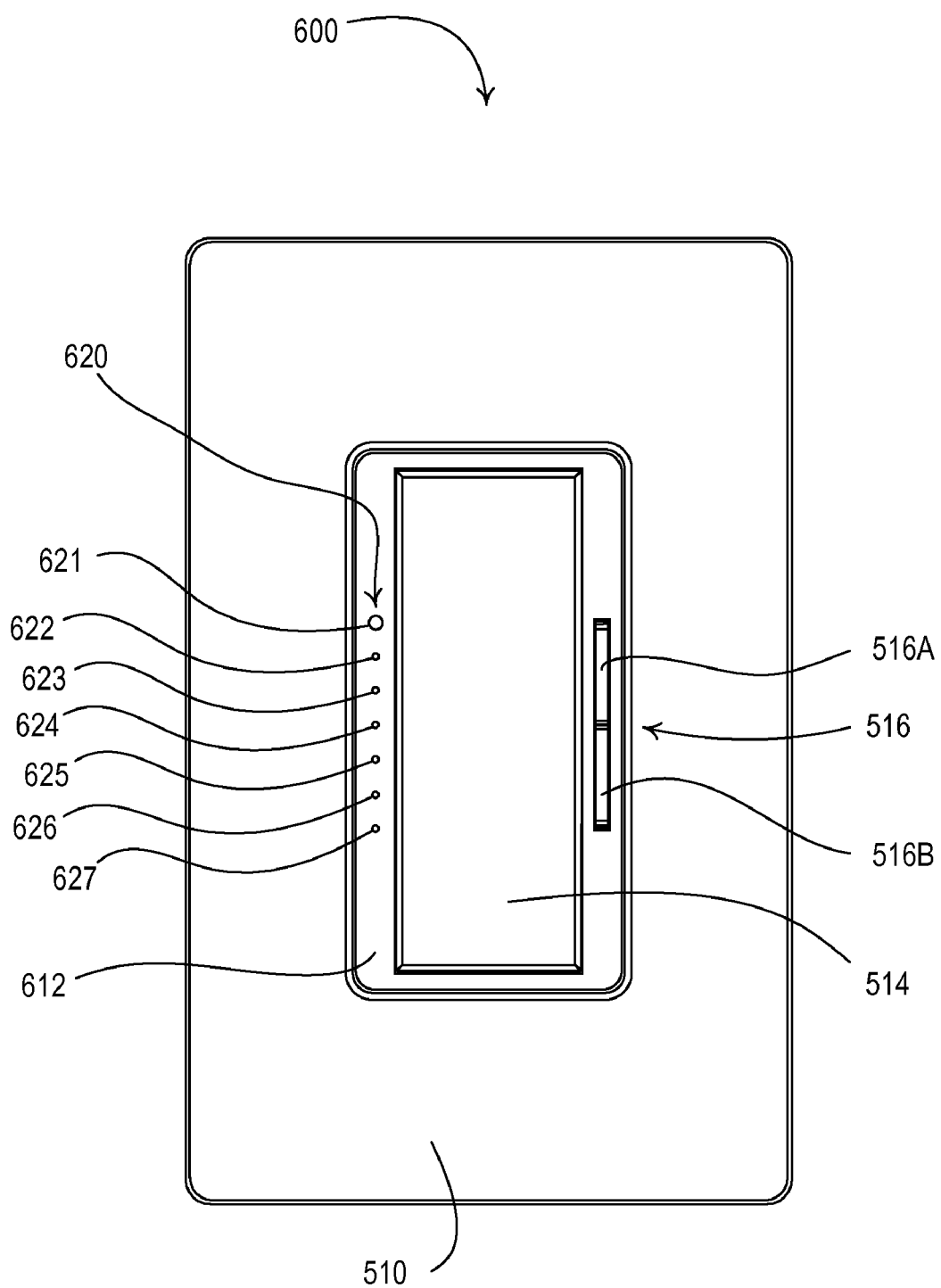
FIG. 19 is a front view of a smart dimmer switch that provides a visual indication representative of energy savings and usage information according to an eighth embodiment of the present invention.

FIG. 19 is a front view of a smart dimmer switch 600 for providing a visual indication representative of energy savings and usage information according to an eighth embodiment of the present invention. The dimmer switch 600 includes the same circuitry as the dimmer switch 500 of the seventh embodiment as shown in FIG. 17. The dimmer switch 600 comprises a bezel 612 having a linear array 620 of visual indicators 621-627. The top visual indicator 621 has a larger diameter (e.g., approximately 0.076 inch) than the other visual indicators 622-627 (e.g., having diameters of approximately 0.031 inch). Since the top visual indicator 621 is larger than the other visual indicators 622-627, the top visual indicator 621 allow more light from the internal LED D51 to shine through to the front of the bezel 612. Accordingly, the top visual indicator 621 appears brighter to a user when the top visual indicator is illuminated red (i.e., above the eco-level intensity $L_{ECO}$) than when the lower visual indicators 622-627 are illuminated green (i.e., below the eco-level intensity $L_{ECO}$).

Figure 20:
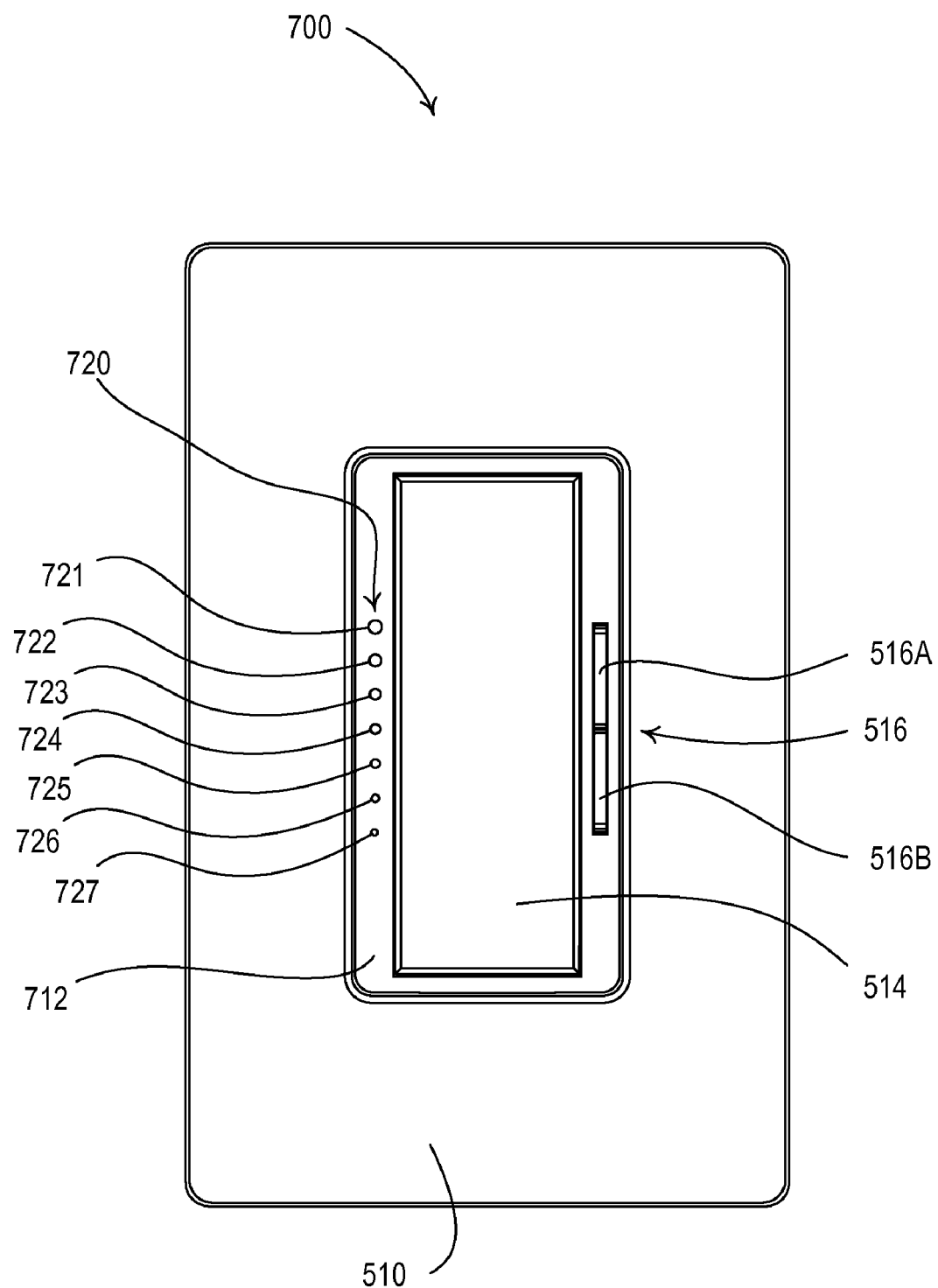
FIG. 20 is a front view of a smart dimmer switch that provides a visual indication representative of energy savings and usage information according to a ninth embodiment of the present invention.

FIG. 20 is a front view of a smart dimmer switch 700 for providing a visual indication representative of energy savings and usage information according to a ninth embodiment of the present invention. The dimmer switch 700 includes the same circuitry as the dimmer switch 500 of the seventh embodiment as shown in FIG. 17. The dimmer switch 700 comprises a bezel 712 having a linear array 720 of visual indicators 721-727 that each have a different diameter. For example, the diameter of the top visual indicator 721 (e.g., approximately 0.076 inch) is larger than the diameter of the bottom visual indicator 727 (e.g., approximately 0.031 inch), and the diameters of the visual indicators 722-726 between the top and bottom visual indicators 721, 727 vary linearly between the diameter of the top visual indicator and the diameter of the bottom visual indicator. Thus, as the lighting intensity L of the lighting load 504 increases, the illuminated visual indicator 721-727 appears brighter.

Figure 21:
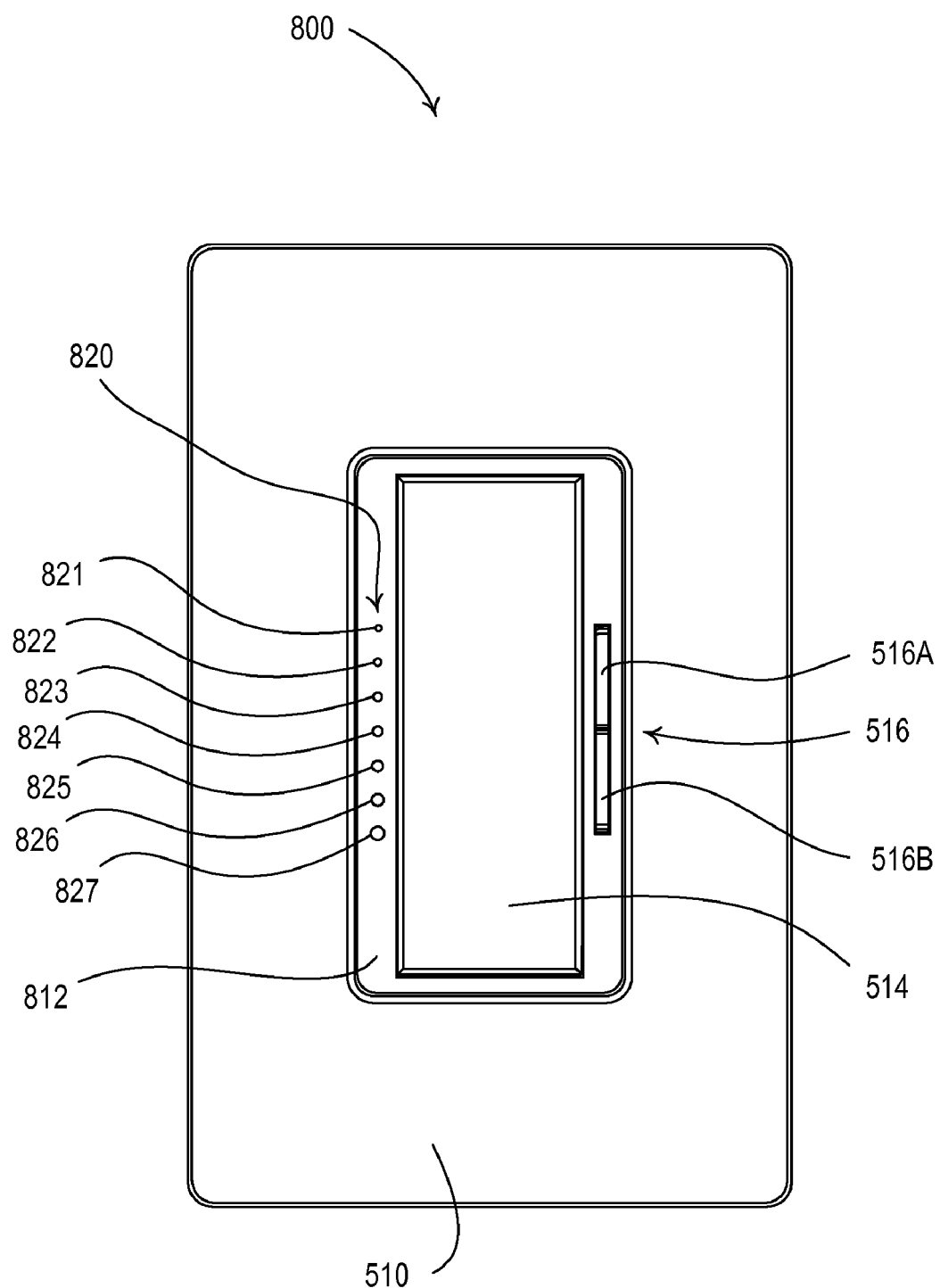
FIG. 21 is a front view of a smart dimmer switch that provides a visual indication representative of energy savings and usage information according to a tenth embodiment of the present invention.

FIG. 21 is a front view of a smart dimmer switch 800 for providing a visual indication representative of energy savings and usage information according to a tenth embodiment of the present invention. The dimmer switch 800 includes the same circuitry as the dimmer switch 500 of the seventh embodiment as shown in FIG. 17. As on the smart dimmer switch 700 of the ninth embodiment, the dimmer switch 800 comprises a bezel 812 having a linear array 820 of visual indicators 821-827, which have different diameters that vary linearly between the diameter of the top visual indicator 821 and the diameter of the bottom visual indicator 827. However, the diameter of the top visual indicator 821 (e.g., approximately 0.031 inch) is less than the diameter of the bottom visual indicator 827 (e.g., approximately 0.076 inch). Thus, as the lighting intensity L of the lighting load 504 is dimmed and more power is saved, the illuminated visual indicator 821-827 appears brighter.

Figure 22:
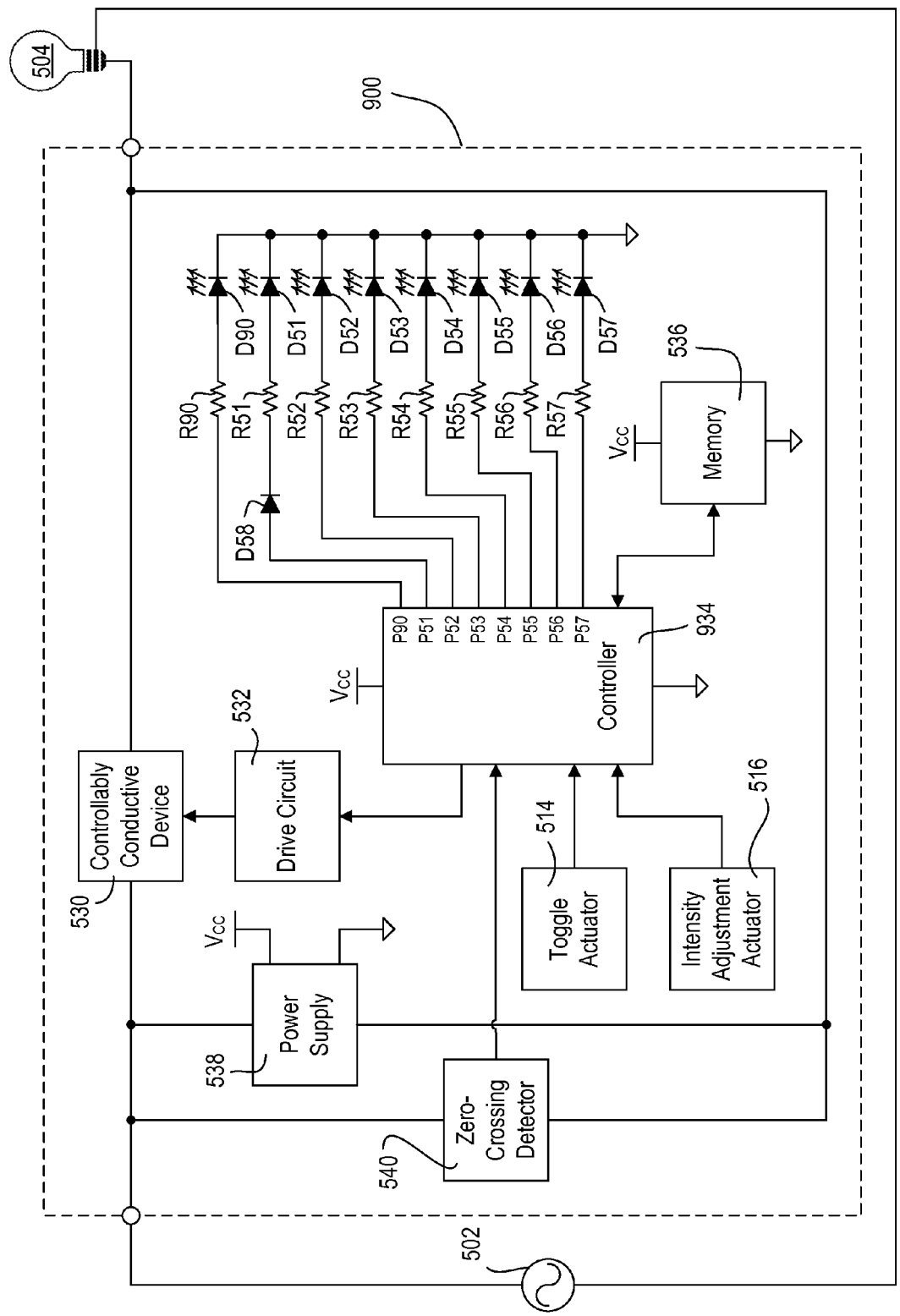
FIG. 22 is a simplified schematic diagram of a smart dimmer switch for providing a visual indication representative of energy savings and usage information according to an eleventh embodiment of the present invention.

FIG. 22 is a simplified schematic diagram of a smart dimmer switch 900 for providing a visual indication representative of energy savings and usage information according to an eleventh embodiment of the present invention. The dimmer switch 900 is similar of the dimmer switch 500 of the seventh embodiment of the present invention as shown in FIGS. 16 and 17. However, the dimmer switch 900 comprises an additional LED D90 of the second color (i.e., green) for illuminating the topmost visual indicator 521 the second color. Alternatively, the red LED D51 and the green LED D90 may comprise a bi-colored LED. A controller 934 controls the topmost green LED D90 and the topmost red LED D51 to selectively illuminate the topmost visual indicator 521 green and red, respectively. The green LED D90 is coupled to an additional pin P90 of the controller 934 via a resistor R90 (e.g., having a resistance of approximately 470Ω).

The dimmer switch 900 operates normally to adjust the lighting intensity L of the lighting load 504 between the low-end intensity $L_{LE}$ and the eco-level intensity $L_{ECO}$ (i.e., the dimming range of the dimmer switch is scaled between the low-end intensity $L_{LE}$ and the eco-level intensity $L_{ECO}$). The dimmer switch 900 turns on the lighting load 504 to at most the eco-level intensity $L_{ECO}$ in response to actuations of the control actuator 514. However, when the lighting intensity L of the lighting load is presently at the eco-level intensity $L_{ECO}$ and the upper portion 516A of the intensity adjustment actuator 516 is actuated, the dimmer switch 900 is operable to increase the lighting intensity L of the lighting load 504 above the eco-level intensity $L_{ECO}$ and up to the high-end intensity $L_{HE}$. The dimmer switch 900 controls the topmost green LED D90 to illuminate the topmost visual indicator 521 green when the lighting intensity L of the lighting load 504 is at (or slightly below) the eco-level intensity $L_{ECO}$. When the lighting intensity L of the lighting load 504 is above the eco-level intensity $L_{ECO}$, the dimmer switch 900 controls the topmost red LED D51 to illuminate the topmost visual indicator 521 red to provide an indication to the user that the dimmer switch 900 and the lighting load 504 may be consuming more power than necessary.

Figure 23A:
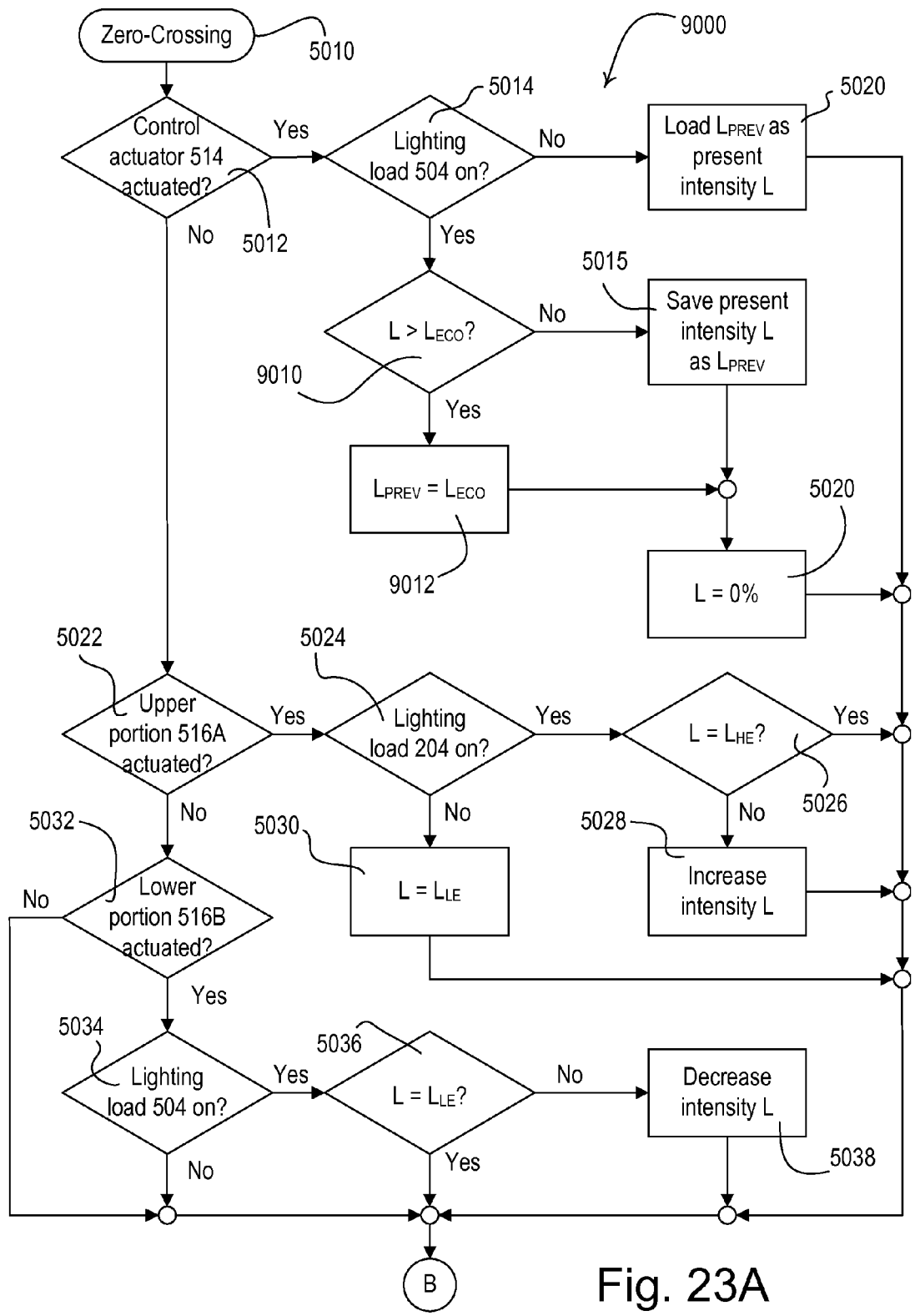
FIGS. 23A and 23B are simplified flowcharts of a control procedure executed periodically by a controller of the dimmer switch of FIG. 22 according to the eleventh embodiment.
Figure 23B:
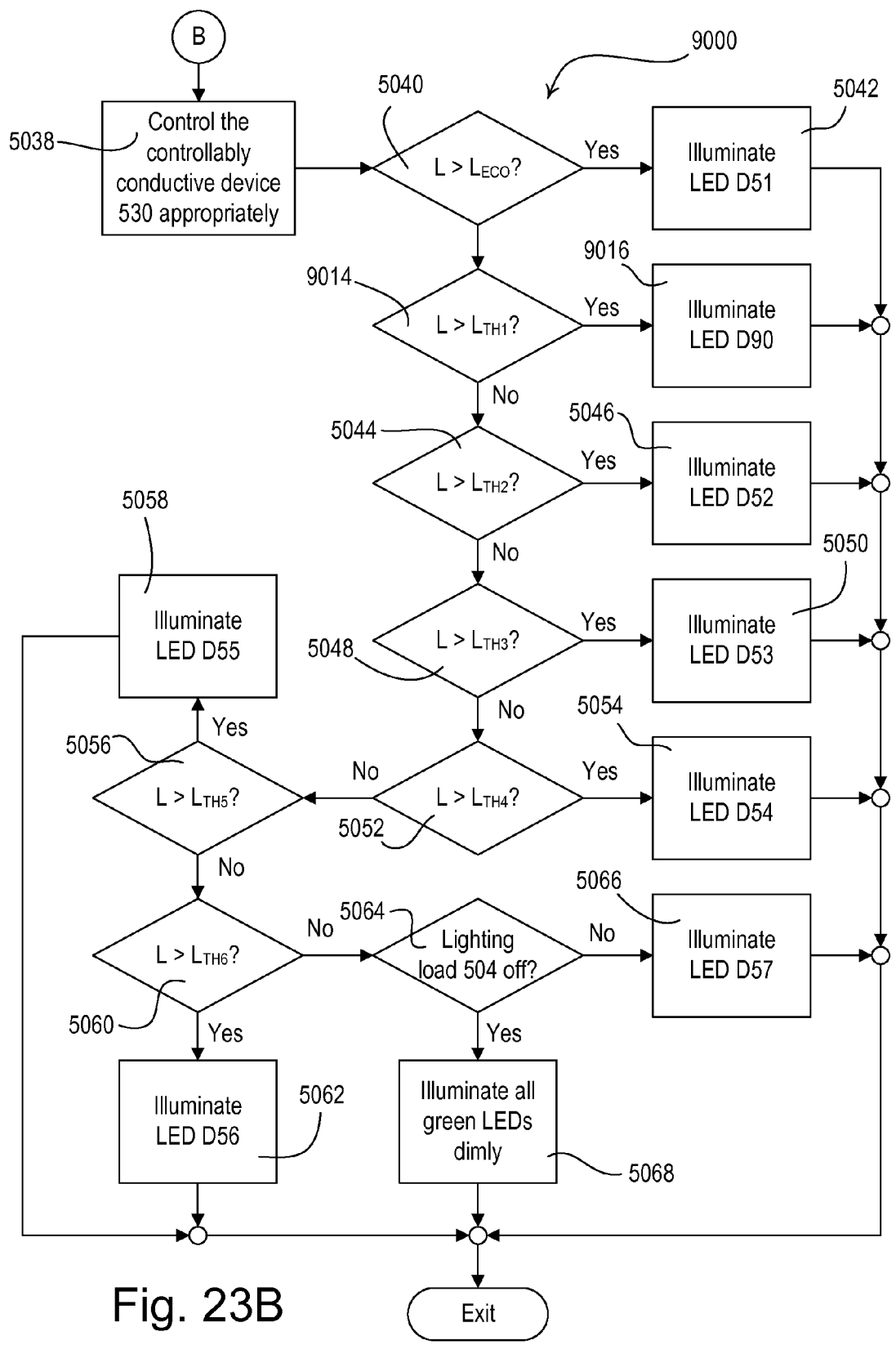

FIGS. 23A and 23B are simplified flowcharts of a control procedure 9000 executed periodically by the controller 934 of the dimmer switch 900 according to the eleventh embodiment of the present invention. For example, the control procedure 9000 is executed once every half-cycle of the AC power source 502 when the zero-crossing detector 540 detects a zero-crossing at step 5010. The control procedure 9000 is very similar to the control procedure 5000 of the seventh embodiment as shown in FIGS. 13A and 13B. However, if the control actuator 514 is actuated at step 5012 and the lighting load is on at step 5014, the controller 934 determines if the present intensity L is greater than the eco-level threshold $L_{ECO}$ at step 9010. If not, the controller 934 saves the present intensity L as the previous intensity $L_{PREV}$ at step 5015 (as in the control procedure 5000 of the seventh embodiment). On the other hand, if the present intensity if greater than the eco-level threshold $L_{ECO}$ at step 9010, the controller 934 stores the eco-level threshold $L_{ECO}$ as the previous intensity $L_{PREV}$ in the memory 516 at step 9012. Accordingly, the next time that the lighting load 504 is turned on in response to an actuation of the control actuator 514, the lighting intensity L of the lighting load 504 will be controlled to at most the eco-level threshold $L_{ECO}$.

Referring to FIG. 18B, if the present intensity L is greater than the eco-level threshold $L_{ECO}$ (i.e., 85%) at step 5040, the controller 934 illuminates the topmost red LED D51 at step 5042 to illuminate the topmost visual indicator 521 red. If the present intensity L is less than the eco-level threshold $L_{ECO}$ at step 5040, but greater than a first threshold lighting intensity $L_{TH1}$ (e.g., 73%) at step 9014, the controller 934 illuminates the topmost green LED D90 at step 9016 to illuminate the topmost visual indicator 521 green. If the present intensity L is less than the first threshold lighting intensity $L_{TH1}$ at step 9014, the controller 934 controls the other LEDs D52-D57 as in the control procedure 5000 of the seventh embodiment. According to the eleventh embodiment, the second, third, fourth, fifth, and sixth threshold lighting intensities $L_{TH2}$, $L_{TH3}$, $L_{TH4}$, $L_{TH5}$, $L_{TH6}$ may comprise, for example, 61%, 49%, 37%, 25%, and 13%, respectively.

Figure 24:
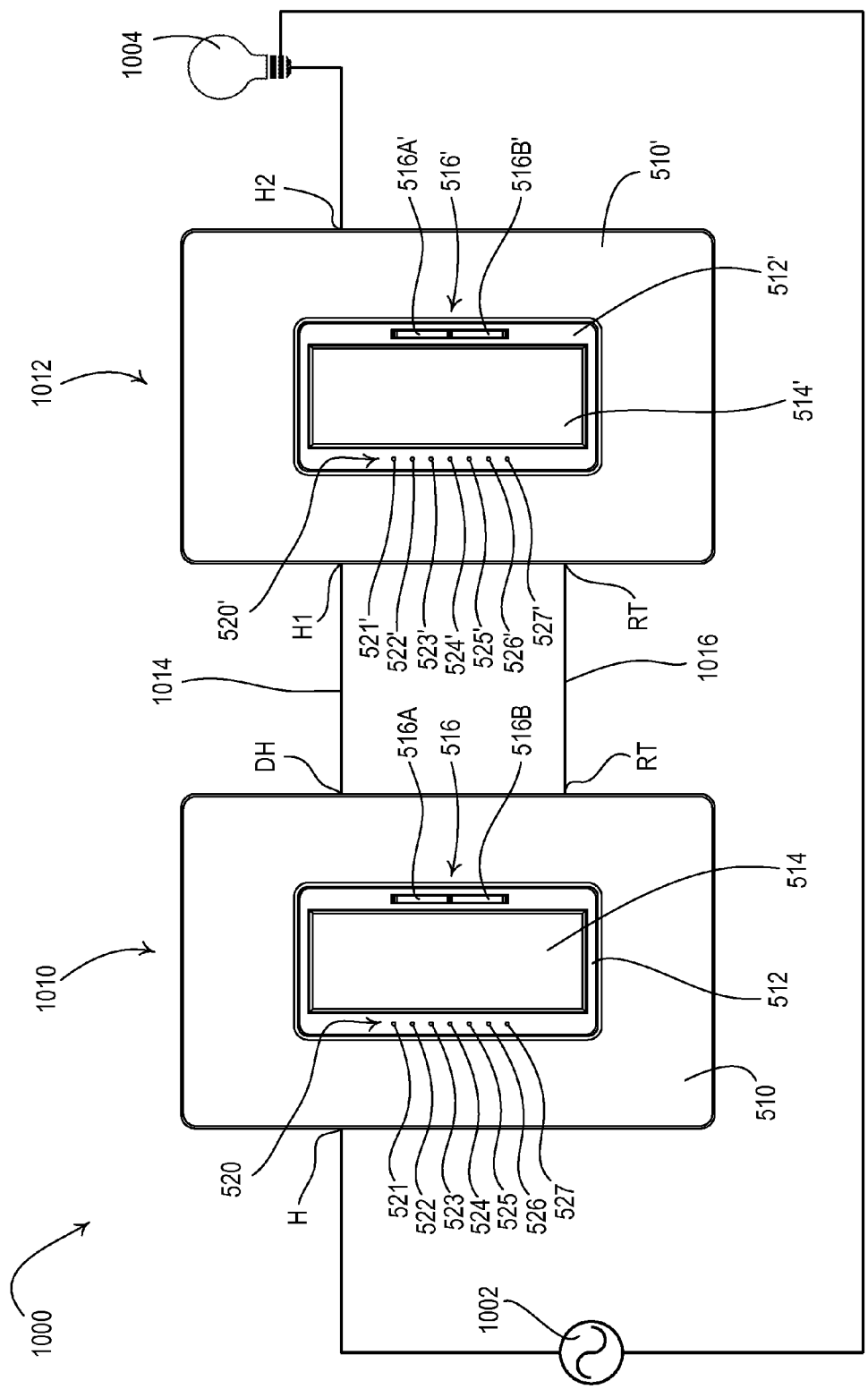
FIG. 24 shows front views of a smart dimmer switch and a remote control of a multiple location dimming system according to a twelfth embodiment of the present invention.

FIG. 24 is a simplified diagram of a multiple location dimming system 1000 having a smart dimmer switch 1010 and a remote control 1012 for providing a visual indication representative of energy savings and usage information according to a twelfth embodiment of the present invention. The dimmer switch 1010 and the remote control 1012 are coupled in series electrical connection between an AC power source 1002 and a lighting load 1004. Specifically, the dimmer switch 1010 comprises a hot terminal H connected to the AC power source 1002 and a dimmed hot terminal DH connected to a first hot terminal H1 of the remote control 1012 via a hot wire 1014. The remote control 1012 also has a second hot terminal H2 connected to the lighting load 1004. The dimmer switch 1010 and the remote control 1012 comprise remote terminals RT connected together via a wired control link 1016 (e.g., a single wire), which allows for communication between the dimmer switch and the remote control 1012. As shown in FIG. 24, the remote control 1012 is connected to the "load side" of the multiple location dimming system 1000. Alternatively, the remote control 1012 could be connected to the "line side" of the system 1000.

The dimmer switch 1010 and the remote control 1012 each have a user interface 1038, 1048 (FIG. 25) that is the same as the user interface of the smart dimmer switch 500 of the seventh embodiment as shown in FIG. 16. Alternatively, the dimmer switch 1010 and the remote control 1012 could have user interfaces as shown in FIG. 19-21. The dimmer switch 1010 includes a controllably conductive device (CCD) 1030

(FIG. 25), such as, a triac, and is able to control the amount of power delivered to the lighting load 1004. The remote control 1012 does not include a controllably conductive device and is not able to directly control the amount of power delivered to the lighting load 1004. However, the remote control 1012 is able to control the intensity of the lighting load 1004 in response to actuations of the control actuator 514' and the intensity adjustment actuator 516' by transmitting control signals to the dimmer switch 1010 via the wired control link 1016 to cause the dimmer switch to adjust the amount of power delivered to the lighting load. The remote control 1012 may then display the visual indication representative of energy savings and usage information on the linear array 520' of visual indicators 521'-527' in a similar fashion as the dimmer switches 500, 600, 700, 800, 900 of the seventh, eighth, ninth, tenth, and eleventh embodiments, respectively.

Figure 25:
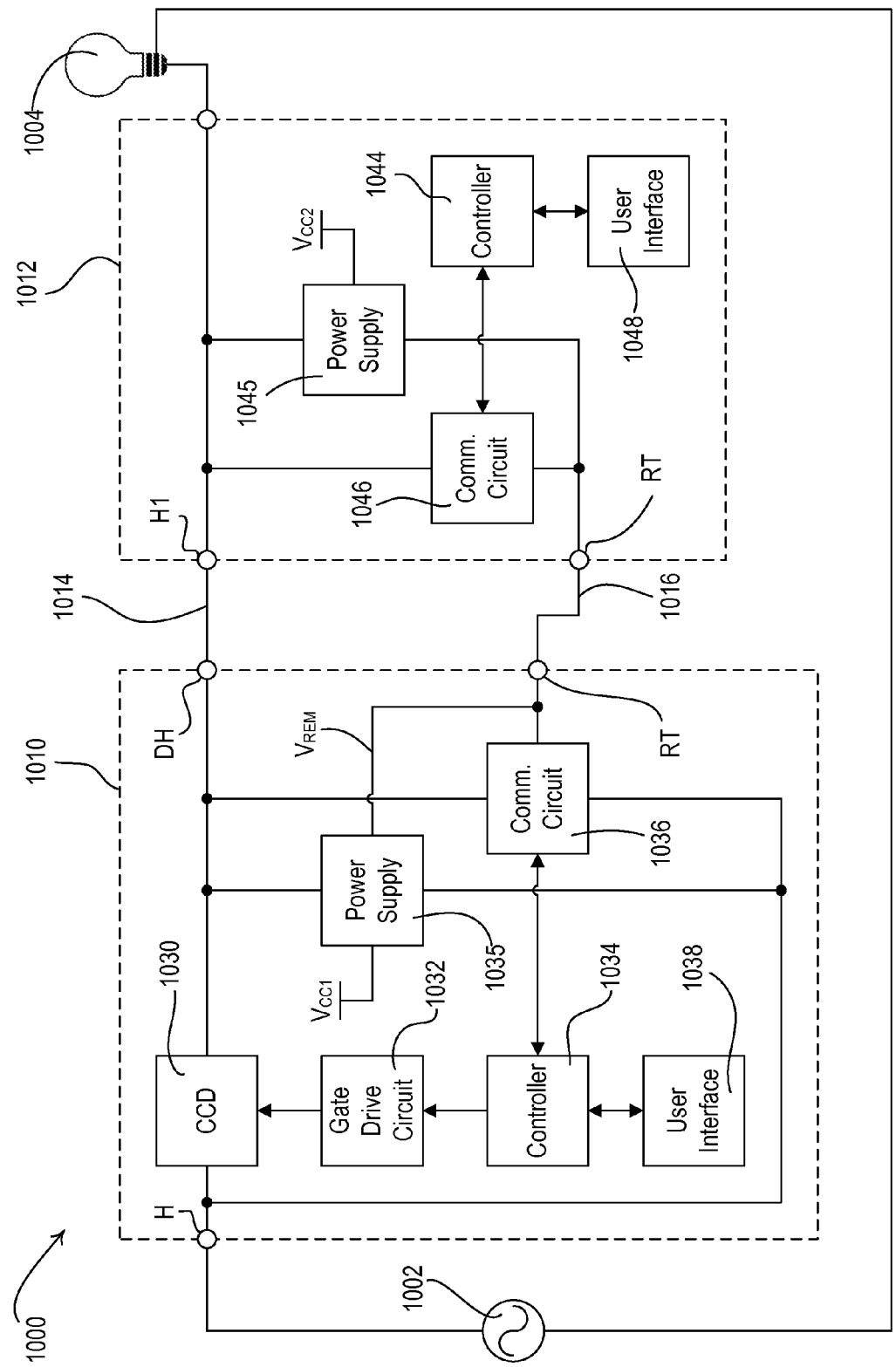
FIG. 25 is a simplified block diagram of the smart dimmer switch and the remote control of the multiple location dimming system of FIG. 24.

FIG. 25 is a simplified block diagram of the smart dimmer switch 1010 and the remote control 1012 of the multiple location dimming system 1000. The controllably conductive device 1030 is coupled in series electrical connection between the hot terminal H and the dimmed hot terminal DH. The dimmer switch 1010 comprises a controller 1034, which is coupled to a control input of the controllably conductive device 1010 via a gate drive circuit 1032 for rendering the controllably conductive device conductive and non-conductive. A power supply 1035 is coupled across the controllably conductive device 1030 and generates a supply voltage $V_{CC1}$ for powering the controller 1034 and other low-voltage circuitry of the dimmer switch 1010. The power supply 1035 also generates a remote power supply voltage $V_{REM}$, which is supplied to the remote terminal RT for powering the remote control 1012. The dimmer switch 1010 further comprises a communication circuit 1036 coupled to the remote terminal RT. The controller 1034 is coupled to the communication circuit 1036 to allow for communication between the dimmer switch 1010 and the remote control 1012. The controller 1034 is further coupled to the user interface 1038 for receipt of user inputs from the control actuator 514 and the intensity adjustment actuator 516 and for control of the visual indicators 521-527.

The first and second hot terminals H1, H2 of the remote control 1012 are electrically connected together, such that the remote control 1012 simply conducts the load current through the lighting load 1004 and the controllably conductive device 1030 of the dimmer switch 1010. The remote control 1012 includes a controller 1044 and a power supply 1045, which is coupled between the remote terminal RT and the hot terminals H1, H2. The power supply 1045 of the remote control 1012 draws current from the power supply 1035 of the dimmer switch 1010 in order to generate a supply voltage $V_{CC2}$ for powering the controller 1044 and other low-voltage circuitry of the remote control. The remote control 1012 also comprises a communication circuit 1046 coupled to the controller 1044 and the remote terminal RT, such that the controller 1044 is able to transmit digital messages to and receive digital messages from the dimmer switch 1010. The controller 1044 is also coupled to the user interface 1048 for receipt of user inputs from the control actuator 514' and the intensity adjustment actuator 516' and for control of the visual indicators 521'-527'. Accordingly, the remote control 1012 is able to control the intensity of the lighting load 1004 in response to actuations of the control actuator 514' and the intensity adjustment actuator 516' and to provide the display the visual indication representative of energy savings and usage information on the linear array 520' of visual indicators 521'-527'. An example of a multiple location dimming system is described in greater detail in commonly-assigned U.S. patent application Ser. No. 12/106,614, filed Apr. 21, 2008, entitled MULTIPLE LOCATION LOAD CONTROL SYSTEM, the entire disclosure of which is hereby incorporated by reference.

Alternatively, the wired control link 1016 may comprise, for example, a two-wire digital communication link, such as a Digital Addressable Lighting Interface (DALI) communication link, or a four-wire digital communication link, such as a RS-485 communication link. Further, the control link 1016 may alternatively comprise a wireless communication link, such as, for example, radio-frequency (RF) or infrared (IR) communication links. An example of an RF dimming system is described in greater detail in commonly-assigned U.S. Pat. No. 7,573,208, issued Aug. 11, 2009, entitled METHOD OF PROGRAMMING A LIGHTING PRESET FROM A RADIO-FREQUENCY REMOTE CONTROL. An example of an IR lighting control system is described in greater detail in commonly-assigned U.S. Pat. No. 6,545,434, issued Apr. 8, 2003, entitled MULTI-SCENE PRESET LIGHTING CONTROLLER, the entire disclosure of which is hereby incorporated by reference. In addition, the control signals may be transmitted between the remote control 1012 and the dimmer switch 1010 on the hot wire 1014 using, for example, current-carrier communication signals. An example of a lighting control system that uses a current-carrier communication technique is described in greater detail in commonly-assigned U.S. patent application Ser. No. 11/447,431, filed Jun. 6, 2006, entitled SYSTEM FOR CONTROL OF LIGHTS AND MOTORS, the entire disclosure of which is hereby incorporated by reference.

Figure 26:
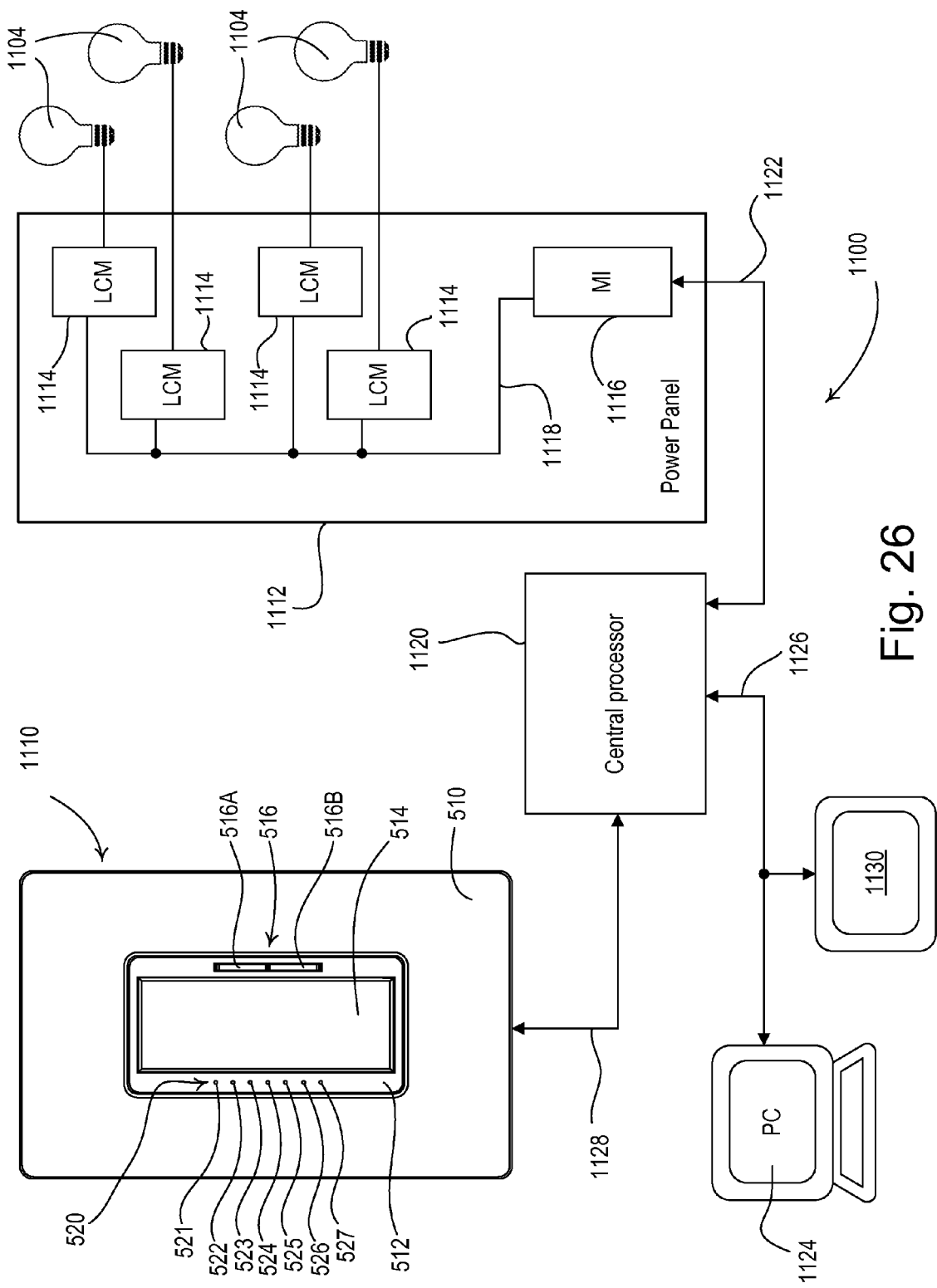
FIG. 26 is a simplified block diagram of a lighting control system having a remote control for providing a visual indication representative of energy savings and usage information according to a thirteenth embodiment of the present invention.

FIG. 26 is a simplified block diagram of a lighting control system 1100 having a remote control 1110 (e.g., a keypad device or a wallstation) for providing a visual indication representative of energy savings and usage information according to a thirteenth embodiment of the present invention. The lighting control system 1100 comprises a power panel 1112 having a plurality of load control modules (LCMs) 1114 (e.g., lighting control devices). Each load control module 1114 may be coupled to a lighting load 1104 for control of the amount of power delivered to, and thus the intensity of, the lighting load. Alternatively, each load control module 1112 may be coupled to more than one lighting load 1104, for example, four lighting loads, for individually controlling the amount of power delivered to each of the lighting loads. The power panel 1112 also comprises a module interface (MI) 1116, which controls the operation of the load control modules 1114 via digital signals transmitted across a power module control link 1118.

The lighting control system 1100 comprises a central processor 1120, which controls the operation of the lighting control system, specifically, the amount of power delivered to each of the lighting loads 1104 by the load control modules 1114. The central processor 1120 is operable to communicate with the module interface 1116 of the power panel 1112 via a module interface (MI) communication link 1122. The module interface 1116 is operable to cause the load control modules 1114 to turn off and on and to control the intensity of the lighting loads 1104 in response to digital messages received by the module interface 1116 from the central processor 1120. The central processor 1120 may also be coupled to a personal computer (PC) 1124 via a PC communication link 1126. The PC 1124 executes a graphical user interface (GUI) program that allows a user of the lighting control system 1100 to setup and monitor the lighting control system. Typically, the GUI software creates a database defining the operation of the lighting control system 1100 and the database is downloaded to the central processor 1120 via the PC communication link 1126. The central processor 1120 comprises a non-volatile memory for storing the database.

The remote control 1110 is coupled to the central processor 1120 via a control device communication link 1128. The remote control 1110 has a user interface that is the same as the user interface of the smart dimmer switch 500 of the seventh embodiment as shown in FIG. 16. Alternatively, the remote control 1110 could have a user interface as shown in FIG. 19-21. The remote control 1110 is operable to transmit digital messages to the central processor 1120 in response to actuations of the control actuator 514 and the intensity adjustment actuator 516. The central processor 1120 may then transmit digital messages to the module interface 1116 to control the intensities of the lighting loads 1104. The central processor 1120 may transmit digital messages to the remote control 1110 to cause the remote control to display the visual indication representative of energy savings and usage information on the linear array 520 of visual indicators 521-527 in a similar fashion as the smart dimmer switches 500, 600, 700, 800, 900 of the seventh, eighth, ninth, tenth, and eleventh embodiments, respectively. Examples of lighting control systems are described in greater detail in commonly-assigned U.S. patent application Ser. No. 11/870,783, filed Oct. 11, 2007, entitled METHOD OF BUILDING A DATABASE OF A LIGHTING CONTROL SYSTEM, and U.S. patent application Ser. No. 12/845,016, filed Jul. 28, 2010, entitled LOAD CONTROL SYSTEM HAVING AN ENERGY SAVINGS MODE, the entire disclosures of which are hereby incorporated by reference.

The lighting control system 1100 could additionally comprise a touch screen or a visual display 1130 coupled to, for example, the PC communication link 1126 for providing a visual indication representative of energy savings and usage information. An example of a visual display is described in greater detail in commonly-assigned U.S. patent application Ser. No. 12/044,672, filed Mar. 7, 2008, entitled SYSTEM AND METHOD FOR GRAPHICALLY DISPLAYING ENERGY CONSUMPTION AND SAVINGS, the entire disclosure of which is hereby incorporated by reference.

The communication links of the lighting control system 1100 (i.e., the MI communication link 1122, the PC communication link 1126, and the control device communication link 1128) may comprise, for example, four-wire digital communication links, such as a RS-485 communication links. Alternatively, the communication links may comprise two-wire digital communication links, such as, DALI communication links, or wireless communication links, such as, radio-frequency (RF) or infrared (IR) communication links. An example of an RF lighting control system is described in greater detail in commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

Figure 27:
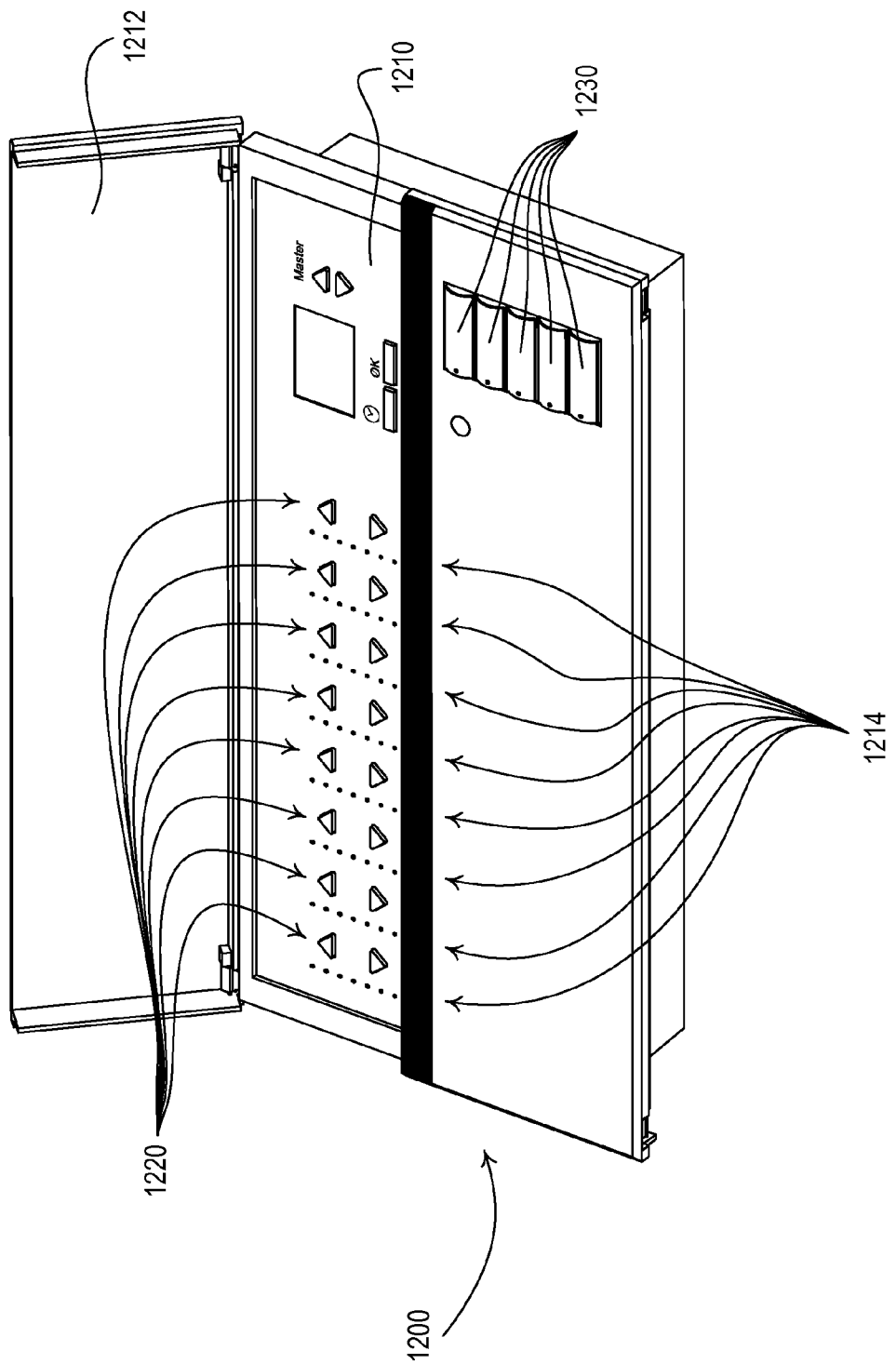
FIG. 27 is a perspective view of a multiple-zone lighting control device for providing a plurality of visual indications representative of energy savings and usage information of a plurality of electrical loads according to a fourteenth embodiment of the present invention.

FIG. 27 is a perspective view of a multiple-zone lighting control device 1200 for providing a plurality of visual indications representative of energy savings and usage information of a plurality of electrical loads according to a fourteenth embodiment of the present invention. The lighting control device 1200 comprises a plurality of lighting control circuits, e.g., dimmer circuits (not shown), for individual control of a plurality of lighting "zones", i.e., lighting loads (not shown). The lighting control device 1200 includes display portion 1210 that may be accessed when a cover 1212 is open as shown in FIG. 27. The display portion 1210 includes a plurality of intensity adjustment actuators 1214, specifically, one intensity adjustment actuator for each lighting zone controlled by the lighting control device 1200, e.g., eight zones as shown in FIG. 27. Each intensity adjustment actuator 1214 comprises a raise button and a lower button, which cause the lighting control device 1200 to respectively increase and decrease the intensity of the respective lighting zone.

The lighting control device 1200 further comprises a plurality of linear arrays 1220 of visual indicators located immediately adjacent (i.e., to the left of) the intensity adjustment actuators 1214. Each linear array 1220 of visual indicators provides a visual indication representative of energy savings and usage information of the respective lighting zone. The linear arrays 1220 of visual indicators may be controlled and displayed in a similar fashion as the smart dimmer switches 500, 600, 700, 800, 900 of the seventh, eighth, ninth, tenth, and eleventh embodiments, respectively. The cover 1212 may be translucent, such that the multiple linear arrays 1220 of visual indicators may be seen through the cover when the cover is closed. Alternatively, the cover 1212 could be opaque, such that the cover conceals the display portion 1210 from view when closed. The lighting control device 1200 also comprises a plurality of preset buttons 1230 for selecting one or more lighting presets (or "scenes"). An example of a multiple zone lighting control device is described in greater detail in commonly-assigned U.S. Pat. No. 5,430,356, issued Jul. 4, 1995, entitled PROGRAMMABLE LIGHTING CONTROL SYSTEM WITH NORMALIZED DIMMING FOR DIFFERENT LIGHT SOURCES, the entire disclosure of which is hereby incorporated by reference.

The present invention has been described with reference to dimmer switches and lighting control systems for controlling the intensities of lighting loads. It should be noted that the concepts of the present invention could be applied to load control devices and load control systems for any type of lighting load (such as, for example, incandescent lamps, fluorescent lamps, electronic low-voltage loads, magnetic low-voltage (MLV) loads, and light-emitting diode (LED) loads) or other electrical load (such as, for example, fan motors and AC motorized window treatments).

Although the present invention has been described in relation to particular embodiments thereof, many other variations and modifications and other uses will become apparent to those skilled in the art. Therefore, the present invention should not be limited by the specific disclosure herein.

What is claimed is:

1. A dimmer switch for controlling the amount of power delivered from a power source to a lighting load, the dimmer switch comprising:
   a controllably conductive device adapted to be coupled in series electrical connection between the source and the lighting load for controlling the intensity of the lighting load;
   an intensity adjustment actuator operatively coupled to the controllably conductive device, such that the controllably conductive device is operable to adjust the intensity of the lighting load between a low-end intensity and a high-end intensity in response to actuations of the intensity adjustment actuator; and
   a visual indicator operable to be illuminated a first color when the intensity of the lighting load is less than or equal to a predetermined eco-level intensity, and a second color different than the first color when the intensity of the lighting load is greater than the predetermined eco-level intensity, the predetermined eco-level intensity being greater than 75% of a maximum possible intensity of the lighting load.

2. The dimmer switch of claim 1, wherein the controllably conductive device comprises a triac, the dimmer switch further comprising:
- a timing circuit coupled in parallel electrical connection with the triac, the timing circuit coupled to a gate of the triac, such that the triac is rendered conductive in response to a timing voltage generated by the timing circuit; and
- a visual indicator circuit coupled in parallel electrical connection with the triac, the visual indicator circuit comprising a first light-emitting diode having the first color, and a second light-emitting diode having the second color, the first and second light-emitting diodes operable to illuminate the visual indicator the respective colors.

3. The dimmer switch of claim 2, further comprising:
a dual potentiometer comprising a single shaft and first and second potentiometer portions having respective wipers controlled together by the single shaft, the first potentiometer portion having a variable resistance and coupled to the timing circuit, such that the triac is rendered conductive in response to the variable resistance of the first potentiometer portion;
wherein the second potentiometer portion is coupled to the visual indicator circuit, such that the first light-emitting diode is illuminated when the intensity of the lighting load is less than or equal to the predetermined eco-level intensity, and the second light-emitting diode is illuminated when the intensity of the lighting load is greater than the predetermined eco-level intensity.

4. The dimmer switch of claim 3, wherein the potentiometer comprises a dual linear potentiometer.

5. The dimmer switch of claim 4, wherein the intensity adjustment actuator comprises a slider knob adapted to move linearly along the length of a slider opening, the slider knob coupled to the shaft of the linear potentiometer, such that the triac is rendered conductive in response to actuations of the slider knob.

6. The dimmer switch of claim 5, further comprising:
a mechanical switch coupled in series electrical connection with the triac, such that the lighting load is on when the mechanical switch is closed and off when the mechanical switch is open.

7. The dimmer switch of claim 6, further comprising:
a rocker switch for actuating the mechanical switch to turn the lighting load on and off.

8. The dimmer switch of claim 6, further comprising:
a toggle actuator on the slider knob for actuating the mechanical switch to turn the lighting load on and off.

9. The dimmer switch of claim 5, wherein the visual indicator is located at a position along the length of the slider opening that is representative of the value of the predetermined eco-level intensity.

10. The dimmer switch of claim 5, wherein the visual indicator is located in the slider knob.

11. The dimmer switch of claim 5, wherein the dimmer switch comprises a tabletop dimmer switch.

12. The dimmer switch of claim 3, wherein the dual potentiometer comprises a dual rotary potentiometer.

13. The dimmer switch of claim 12, wherein the intensity adjustment actuator comprises a rotary knob adapted to be rotated, the rotary knob coupled to the shaft of the rotary potentiometer, such that the triac is rendered conductive in response to actuations of the rotary knob.

14. The dimmer switch of claim 13, wherein the rotary potentiometer comprises a mechanical switch coupled in series electrical connection with the controllably conductive device, such that the lighting load is on when the mechanical switch is closed and off when the mechanical switch is open, the mechanical switch operable to be opened and closed in response to actuations of the rotary knob to push the knob in towards the dimmer switch.

15. A dimmer switch for controlling the amount of power delivered from a power source to a lighting load, the dimmer switch comprising:
- a controllably conductive device adapted to be coupled in series electrical connection between the source and the lighting load for controlling the intensity of the lighting load;
- an intensity adjustment actuator operatively coupled to the controllably conductive device, such that the controllably conductive device is operable to adjust the intensity of the lighting load between a low-end intensity and a high-end intensity in response to actuations of the intensity adjustment actuator; and
- a visual indicator operable to be illuminated a first color when the intensity of the lighting load is less than or equal to a predetermined lower eco-level intensity, and a second color different than the first color when the intensity of the lighting load is greater than a predetermined upper eco-level intensity, the lower and upper eco-level intensities being greater than 75% of a maximum possible intensity of the lighting load.

16. The dimmer switch of claim 15, wherein the visual indicator is illuminated a third color when the intensity of the lighting load is between the upper and lower eco-level intensities, the third color being different than the first and second colors.

17. The dimmer switch of claim 16, further comprising:
a visual indicator circuit coupled in parallel electrical connection with the controllably conductive device, the visual indicator circuit comprising a first light-emitting diode having the first color, and a second light-emitting diode having the second color, the first and second light-emitting diodes operable to illuminate the visual indicator the respective colors.

18. The dimmer switch of claim 17, wherein both of the light-emitting diodes are illuminated at the same time to illuminate the visual indicator the third color when the intensity of the lighting load is between the upper and lower eco-level intensities.

19. The dimmer switch of claim 18, wherein the controllably conductive device comprises a triac, the dimmer switch further comprising:
- a timing circuit coupled in parallel electrical connection with the triac, the timing circuit coupled to a gate of the triac, such that the triac is rendered conductive in response to a timing voltage generated by the timing circuit;
- a dual potentiometer comprising a single shaft and first and second potentiometer portions having respective wipers controlled together by the single shaft, the first potentiometer portion having a variable resistance and coupled to the timing circuit, such that the triac is rendered conductive in response to the variable resistance of the first potentiometer portion;
wherein the second potentiometer portion is coupled to the visual indicator circuit and comprises a cut, such that only the first light-emitting diode is illuminated when the intensity of the lighting load is less than or equal to the lower eco-level intensity, only the second light-emitting diode is illuminated when the intensity of the lighting load is greater than the upper eco-level intensity, and both of the light-emitting diodes are illuminated at the same time to illuminate the visual indicator the third color when the intensity of the lighting load is between the upper and lower eco-level intensities.

20. The dimmer switch of claim 16, wherein the first color is green, the second color is red, and the third color is yellow.

21. The dimmer switch of claim 15, wherein the lower eco-level intensity is equal to the upper eco-level intensity, such that the visual indicator is illuminated the first color when the intensity of the lighting load is less than or equal to the lower eco-level intensity, and the second color when the intensity of the lighting load is greater than the lower eco-level intensity.

* * * * *